(12) United States Patent
Ban et al.

(10) Patent No.: US 11,650,597 B2
(45) Date of Patent: May 16, 2023

(54) ELECTRONIC APPARATUS FOR IDENTIFYING OBJECT THROUGH WARPED IMAGE AND CONTROL METHOD THEREOF

(71) Applicant: SAMSUNG ELECTRONICS CO., LTD., Suwon-si (KR)

(72) Inventors: Daehyun Ban, Suwon-si (KR); Yongsung Kim, Suwon-si (KR); Chanju Park, Seoul (KR); Chanwon Seo, Suwon-si (KR); Hongpyo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 16/922,655

(22) Filed: Jul. 7, 2020

(65) Prior Publication Data

US 2021/0011476 A1  Jan. 14, 2021

(30) Foreign Application Priority Data

Jul. 9, 2019 (KR) .................. 10-2019-0082845
Oct. 25, 2019 (KR) .................. 10-2019-0134046

(51) Int. Cl.
*G05D 1/02* (2020.01)
*G05D 1/00* (2006.01)
(Continued)

(52) U.S. Cl.
CPC ......... *G05D 1/0246* (2013.01); *G05D 1/0088* (2013.01); *G06T 3/0093* (2013.01);
(Continued)

(58) Field of Classification Search
CPC .......... G05D 1/0088; G05D 2201/0203; G06T 7/74; G06T 3/0093; G06T 2207/20081; G06V 20/10; G06V 10/757
See application file for complete search history.

(56) References Cited

U.S. PATENT DOCUMENTS 5,528,703 A * 6/1996 Lee .................. G06V 10/24
382/128
7,184,609 B2   2/2007 Liu et al.
(Continued)

FOREIGN PATENT DOCUMENTS

EP   3 505 310 A1   7/2019
JP   5384746 B2    1/2014
(Continued)

OTHER PUBLICATIONS

Alexandre Alahi et al. Cascade of descriptors to detect and track objects across any network of cameras; (Jun. 2010) Elsevier vol. 114, Issue 6 (Year: 2010).*

(Continued)

*Primary Examiner* — Gertrude Arthur Jeanglaude
(74) *Attorney, Agent, or Firm* — Sughrue Mion, PLLC

(57) ABSTRACT

An electronic apparatus is provided. The electronic apparatus includes: a sensor; a camera; a memory; and a processor configured to be connected to the sensor, the camera, and the memory. The memory includes an artificial intelligence model trained to identify at least one object. The processor is further configured to: detect an object based on sensing data received from the sensor; based on the detected object being identified as having a height less than a predetermined threshold value, warp an object region, including the detected object, in an image acquired through the camera based on distance information of the object region; and (Continued)

identify the detected object by inputting the warped object region into the artificial intelligence model.

19 Claims, 27 Drawing Sheets

(51) Int. Cl.
  *G06T 3/00* (2006.01)
  *G06T 7/73* (2017.01)
  *G06V 20/10* (2022.01)

(52) U.S. Cl.
  CPC .............. *G06T 7/74* (2017.01); *G06V 20/10* (2022.01); *G05D 2201/0203* (2013.01); *G06T 2207/20081* (2013.01)

(56) References Cited

U.S. PATENT DOCUMENTS

| | | | |
|---|---|---|---|
| 8,705,876 | B2 | 4/2014 | Vaddadi et al. |
| 9,323,432 | B2 | 4/2016 | Kang et al. |
| 9,384,405 | B2 | 7/2016 | Choi et al. |
| 10,129,521 | B2 | 11/2018 | Einecke et al. |
| 10,664,716 | B2 * | 5/2020 | Liu ..................... G06T 7/0004 |
| 2011/0234481 | A1 | 9/2011 | Katz et al. |
| 2014/0225990 | A1 | 8/2014 | Einecke et al. |
| 2016/0132744 | A1 | 5/2016 | Choi et al. |
| 2018/0353042 | A1 | 12/2018 | Gil et al. |
| 2019/0176330 | A1 | 6/2019 | Noh et al. |
| 2019/0179333 | A1 | 6/2019 | Noh et al. |
| 2019/0196495 | A1 | 6/2019 | Noh et al. |
| 2020/0089970 | A1 | 3/2020 | Lee et al. |

FOREIGN PATENT DOCUMENTS

| | | | |
|---|---|---|---|
| JP | 5926228 | B2 | 5/2016 |
| JP | 6240619 | B2 | 11/2017 |
| KR | 10-2009-0067484 | A | 6/2009 |
| KR | 101213855 | B1 | 12/2012 |
| KR | 10-2013-0061440 | A | 6/2013 |
| KR | 10-2016-0055005 | A | 5/2016 |
| KR | 10-1822942 | B1 | 1/2018 |
| KR | 10-2018-0023301 | A | 3/2018 |
| KR | 10-2018-0112623 | A | 10/2018 |
| KR | 10-2018-0134230 | A | 12/2018 |
| KR | 101965058 | B1 | 4/2019 |
| KR | 10-2019-0046201 | A | 5/2019 |

OTHER PUBLICATIONS

Communication dated Aug. 18, 2020, issued by the Korean Intellectual Property Office in Korean Patent Application No. 10-2019-0134046.

International Search Report and Written Opinion (PCT/ISA/210 and PCT/ISA/237) dated Sep. 29, 2020, issued by the International Searching Authority in International Application No. PCT/KR2020/008960.

Communication dated Apr. 25, 2022, issued by the European Patent Office in European Application No. 20836036.2.

* cited by examiner

ELECTRONIC APPARATUS FOR IDENTIFYING OBJECT THROUGH WARPED IMAGE AND CONTROL METHOD THEREOF

CROSS-REFERENCE TO RELATED APPLICATION(S)

This application is based on and claims priority under 35 U.S.C. § 119 to Korean Patent Application No. 10-2019-0082845, filed on Jul. 9, 2019, and Korean Patent Application No. 10-2019-0134046, filed on Oct. 25, 2019, in the Korean Intellectual Property Office, the disclosures of which are herein incorporated by reference in their entireties.

BACKGROUND

1. Field

The disclosure relates to object recognition, and more particularly, to an electronic apparatus and a control method of the electronic apparatus, in which an object region including a flat object in an image acquired through a camera is corrected according to distance information, and object recognition is performed by using the corrected object region.

2. Description of Related Art

An electronic apparatus that performs object recognition generally recognizes an object in an image by inputting the image captured through a camera into an artificial intelligence model.

However, there is a problem in the related art that an object recognition rate or accuracy is not constant according to an angle at which the camera provided in the electronic apparatus captures a surrounding object, a distance between the camera and the surrounding object, and the like.

In particular, the object recognition rate or accuracy is relatively low for an object captured at a long distance from the camera. In addition, when a position of the camera is relatively low, such as the camera included in a robot cleaner, the object recognition rate or accuracy is relatively low for an object that is placed on the floor and flat.

In order to solve such problems, methods such as using a camera capable of acquiring a high-resolution image, or dividing a captured image into a plurality of regions and sequentially recognizing an object for each of the plurality of regions have been used, but these methods are disadvantageous in that the amount of computation increases and the rate of computation decreases, while an effect of object recognition is not much improved.

SUMMARY

In accordance with an aspect of the disclosure, there is provided an electronic apparatus including: a sensor; a camera; a memory; and a processor, wherein the memory includes an artificial intelligence model trained to identify an object, and the processor is configured to: detect an object through sensing data received from the sensor, identify whether or not the detected object is a floor object that the electronic apparatus is able to cross or climb; warp an object region including the detected object of an image acquired through the camera on the basis of distance information of the object region, based on the detected object identified as the floor object, and identify the detected object by inputting the warped object region into the artificial intelligence model.

According to an aspect of an embodiment, provided is an electronic apparatus, including: a sensor; a camera; a memory; and a processor, wherein the memory includes an artificial intelligence model trained to identify an object, and the processor is configured to: detect an object through sensing data received from the sensor, identify whether or not the detected object is a floor object that the electronic apparatus is able to cross or climb; warp an image acquired through the camera on the basis of distance information of a plurality of regions in the image, based on the detected object identified as the floor object, and identify the detected object by inputting the warped image into the artificial intelligence model.

In accordance with an aspect of the disclosure, there is provided an electronic apparatus including: a sensor; a camera; a memory; and a processor configured to be connected to the sensor, the camera, and the memory to control the electronic apparatus, wherein the memory includes a plurality of artificial intelligence models trained to identify a floor object that the electronic apparatus is able to cross or climb, the plurality of artificial intelligence models are trained based on images of the floor object captured at different distances, and the processor is configured to: detect an object through sensing data received from the sensor, identify whether or not the detected object is the floor object, warp an object region including the detected object of the images acquired through the camera on the basis of distance information of the object region, based on the detected object identified as the floor object, identify an artificial intelligence model trained based on an image corresponding to the distance information of the object region among the plurality of artificial intelligence models, and identify the detected object by inputting the warped object region into the identified artificial intelligence model.

In accordance with an aspect of the disclosure, there is provided a control method of an electronic apparatus including a memory in which an artificial intelligence model trained to identify an object is stored, the control method including: detecting an object through sensing data received from a sensor; identifying whether or not the detected object is a floor object that the electronic apparatus is able to cross or climb; warping an object region including the detected object of an image acquired through a camera on the basis of distance information of the object region, based on the detected object identified as the floor object; and identifying the detected object by inputting the warped object region into the artificial intelligence model.

In accordance with an aspect of the disclosure, there is provided an electronic apparatus, including: a sensor; a camera; a memory; and a processor configured to be connected to the sensor, the camera, and the memory, wherein the memory includes an artificial intelligence model trained to identify at least one object, and wherein the processor is further configured to: detect an object based on sensing data received from the sensor; based on the detected object being identified as having a height less than a predetermined threshold value, warp an object region, including the detected object, in an image acquired through the camera based on distance information of the object region; and identify the detected object by inputting the warped object region into the artificial intelligence model.

In accordance with an aspect of the disclosure, there is provided an electronic apparatus including: a sensor; a camera; a memory; and a processor configured to be connected to the sensor, the camera, and the memory, wherein the memory includes a plurality of artificial intelligence models trained to identify at least one object, wherein the plurality of artificial intelligence models are trained based on images of the at least one object captured at different distances, and wherein the processor is further configured to: detect an object based on sensing data received from the sensor; based on the detected object being identified as having a height less than a predetermined threshold value, warp an object region, including the detected object, in an image acquired through the camera based on distance information of the object region; identify, among the plurality of artificial intelligence models, an artificial model that is trained based on an image corresponding to the distance information of the object region; and identify the detected object by inputting the warped object region into the identified artificial intelligence model.

In accordance with an aspect of the disclosure, there is provided a method of controlling an electronic apparatus, the electronic apparatus including a memory in which an artificial intelligence model trained to identify an object is stored, the method including: detecting an object based on sensing data received from a sensor; identifying whether the detected object is crossable or climbable by the electronic apparatus when the electronic apparatus is driven to move; based on the detected object being identified as being crossable or climbable by the electronic apparatus, warping an object region, including the detected object, in an image acquired through a camera based on distance information of the object region; and identifying the detected object by inputting the warped object region into the artificial intelligence model.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
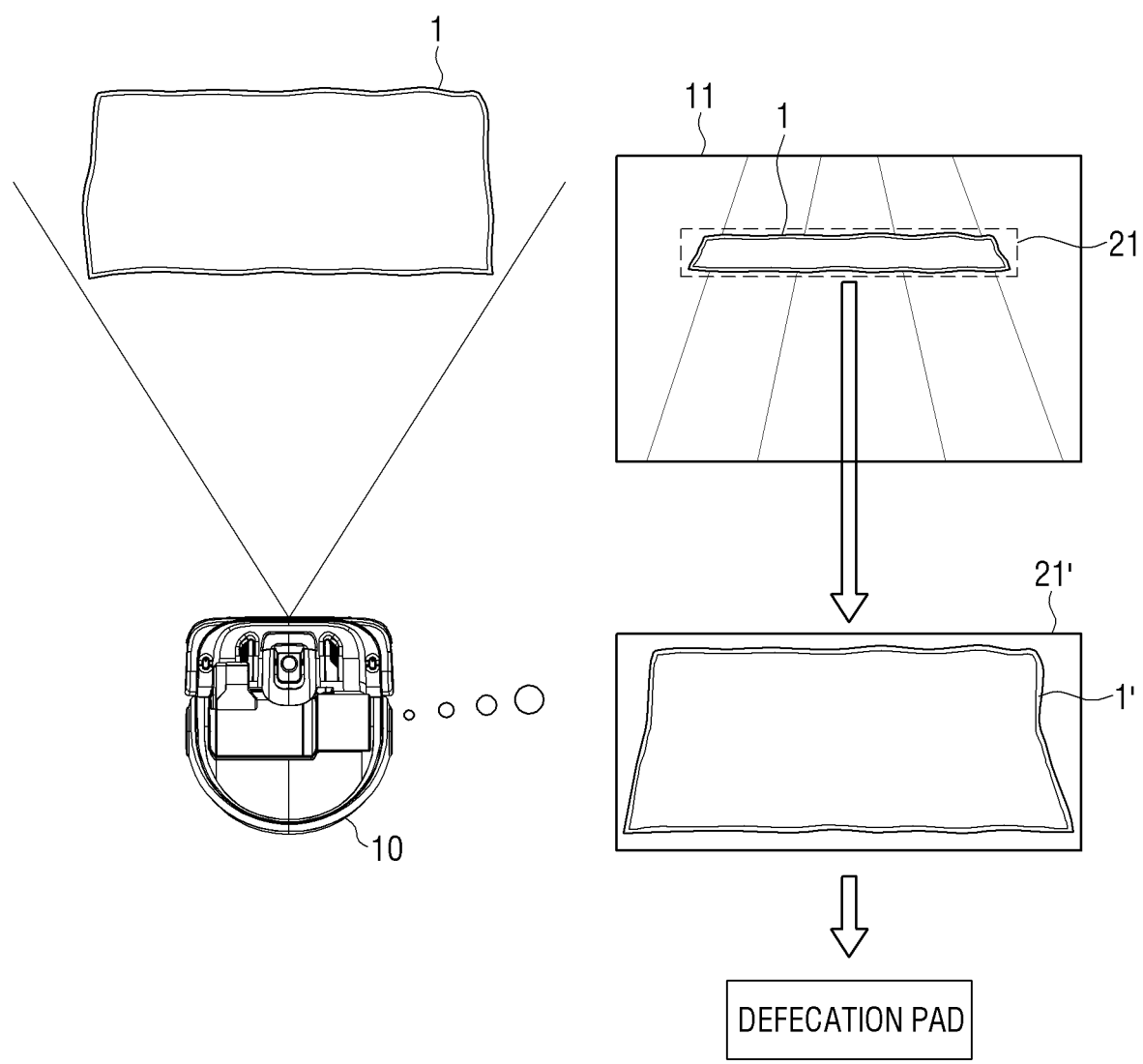
FIG. 1 is a diagram illustrating an example of correcting an object region including an object to identify the object, in an electronic apparatus according to an embodiment.

Various embodiments provide an electronic apparatus capable of performing object recognition with a high object recognition rate regardless of a perspective or a capturing angle of an object captured through a camera, and a control method of the electronic apparatus.

More particularly, embodiments provide an electronic apparatus capable of performing object recognition with a high object recognition rate even with a flat object (or an object having a relatively low height) placed on the ground, and a control method thereof.

The terms used in the specification and claims have chosen generic terms in consideration of the functions in various embodiments. However, these terms may vary depending on the intention of a person skilled in the art, legal or technical interpretation, and the appearance of new technologies. In addition, some terms are arbitrarily chosen by the applicant. These terms may be interpreted as meanings defined in the specification, and may also be interpreted based on the general contents of the specification and common technical knowledge in the art without specific term definitions.

In addition, like reference numerals or symbols in the drawings attached to the specification denote parts or components that perform substantially the same functions. For convenience of explanation and understanding, different embodiments will be described using the same reference numerals or symbols. That is, although all of the components having the same reference numerals are shown in the drawings, the drawings do not imply one embodiment.

In addition, in the specification and claims, the terms including ordinal numbers such as "first" and "second" may be used to distinguish between the components. These ordinal numbers are used to distinguish the same or similar components from each other, and the meaning of the terms should not be construed as being limited by the use of these ordinal numbers. As an example, the components coupled to the ordinal number should not be interpreted as a use order, a layout order, or the like being limited by the number. The respective ordinal numbers are interchangeably used, if necessary.

In the specification, the singular expression includes the plural expression unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

A term "module", "unit" "part", or the like, in the embodiments is a term for referring to the component performing at least one function or operation, and such a component may be implemented in hardware or software or a combination of hardware and software. In addition, a plurality of "modules", "units", "parts", or the like may be integrated into at least one module or chip and may be implemented in at least one processor, except for a case in which they need to be each implemented in individual specific hardware.

In addition, in the embodiments, it will be understood that when an element is referred to as being "connected to" another element, this includes not only a direct connection but also an indirect connection through another medium. In addition, unless explicitly described otherwise, "comprising" any components will be understood to imply the inclusion of other components but not the exclusion of any other components.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

FIG. 1 is a diagram illustrating an example of correcting (or scaling) an object region including an object to identify the object in an electronic apparatus according to an embodiment.

Referring to FIG. 1, an electronic apparatus 10 may detect a surrounding object through a sensor while moving and capturing an area (e.g., a front area) around the electronic apparatus by using a camera, for example, included in the electronic apparatus 10. For example, the electronic apparatus 10 may be implemented as a robot cleaner. In FIG. 1, for illustrative purposes, it is assumed that the electronic apparatus 10 detects an object 1 in the front area while being driven.

The electronic apparatus 10 may identify the object 1 as a defecation pad 1' by inputting at least a portion of an image 11 captured through the camera into an artificial intelligence model for object identification.

However, referring to FIG. 1, the object 1 is captured at a very low angle according to a height of the electronic apparatus 10 implemented as the robot cleaner, and thus, the object 1 in the image 11 may appear on the image 11 in a distorted form with a very narrow vertical length.

That is, when the electronic apparatus 10 inputs the image 11 into the artificial intelligence model for object identification, there is a high possibility that the 'defecation pad' is not identified due to the distorted form of the objet 1 in the image 11.

To solve this problem, the electronic apparatus 10 of FIG. 1 may identify a height of the object 1 detected through the sensor, and based on the identified height of the object 1, the electronic apparatus 10 may identify that the object 1 is an object having a relatively low height, that is, the object 1 corresponds to an object that is laid on a floor (hereinafter, referred to as "floor object") that the electronic apparatus 10 may cross or climb over. Although the term "floor object" includes "floor", it should be understood that this term is merely for describing the disclosure and simplifying the description, and does not indicate or imply that the element referred must have a particular positional relationship with the "floor" (e.g., in contact with the floor), and thus this term should not be construed as limiting the disclosure. The term "floor object" is intended to include any object that has a distorted form or shape in an image of the object due to a low angle at which the object is captured.

In this case, the electronic apparatus 10 may identify an object region 21 corresponding to the detected object 1 of the image 11 acquired through the camera, and then warp the object region 21 so that the object region 21 is generally enlarged and an object region 21' as show in FIG. 1 is obtained. As a result, referring to the object region 21' warped in FIG. 1, the shape of the defecation pad 1' in the image is restored to be similar to an actual shape of the defecation pad.

In addition, the electronic apparatus 10 may identify the object 1 as the defecation pad 1' by inputting the warped object region 21' into the artificial intelligence model for object identification.

As such, because the electronic apparatus 10 according to an embodiment corrects the object region including the floor object and then identifies the floor object based on the corrected object region, an accuracy of object identification may be improved even if the floor object is captured at a relatively low angle.

Hereinafter, the configuration and operation of an electronic apparatus according to various embodiments will be described in more detail with reference to the drawings.

Figure 2A:
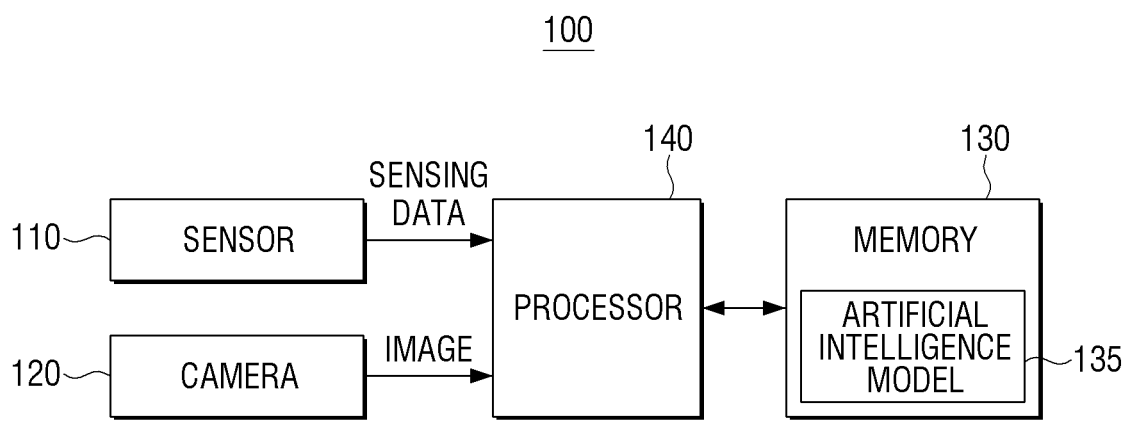
FIG. 2A is a block diagram illustrating a configuration of an electronic apparatus according to an embodiment.

FIG. 2A is a block diagram illustrating a configuration of an electronic apparatus according to an embodiment.

Referring to FIG. 2A, an electronic apparatus 100 may include a sensor 110, a camera 120, a memory 130, and a processor 140. The electronic apparatus 100 may be implemented as one or more various terminal devices such as a robot cleaner, a health care robot, a smart phone, a tablet personal computer (PC), and a wearable device, but is not limited thereto.

The processor 140 according to an embodiment may detect an object around the electronic apparatus 100 through the sensor 110. The processor 140 may identify a height of the detected object using sensing data of the sensor 110.

In this case, the processor 140 may determine whether the detected object is a specific type of an object (e.g., a floor object). In an embodiment, the electronic apparatus 100 may be a terminal device that is located on a specific location (e.g., a floor), as in an example of a robot cleaner. In this embodiment, the processor 140 may identify the height of the object detected from the floor where the electronic apparatus 100 is located, and may identify the detected object as the floor object when the identified height is less than a predetermined threshold value.

The floor object includes an object placed on the floor and may refer to an object of which a height from the floor is less than a threshold value. The floor may mean a surface as the ground on which the electronic apparatus 100 is placed. For example, the floor may be a flat surface. The floor needs not to be completely flat and may be identified as a floor by the electronic apparatus 100 if a degree of a curvature in the floor is less than a threshold numerical value.

The degree of a curvature in the floor may refer to a degree of deformation or distortion based on a plane including two or more points of the ground on which the electronic apparatus 100 is placed, and for example, a section of the ground that is depressed or partially protruding may be identified as not the floor depending on the degree of a curvature of the section of the ground.

Specifically, the degree of a curvature of a specific section of the ground may correspond to a distance of the specific section from a plane including two or more points of the ground on which the electronic apparatus 100 is placed, and when a distance between the specific section of the ground and the plane including two or more points of the ground on which the electronic apparatus 100 is placed is a threshold numerical value or more, the corresponding section of the ground may be identified as not the floor.

The floor object according to an embodiment does not include any object that is simply placed on the floor, and refers to an object that is not only placed on the floor, but also has a height from the floor that is less than a predetermined threshold value. For example, a defecation pad, a carpet, a mat, a threshold, of which a height is less than a certain value, or the like may correspond to the floor object.

The above-described threshold value, which is a reference for determining whether the detected object is the floor object, may be preset based on a maximum height of an object upon which the electronic apparatus 100 may cross or climb over by using a moving means provided in the electronic apparatus 100. For example, the threshold value may be determined based on a length of a diameter of a wheel constituting the moving means of the electronic apparatus 100. In addition, the threshold value may be determined based on the threshold numerical value related to the degree of a curvature in the floor described above.

The processor 140 may acquire an image including the detected object through the camera 120. Here, the processor 140 may control the camera 120 to capture an image of the surroundings at a predetermined time interval, and/or may control the camera 120 to capture an image in a direction in which the detected object is located only when the object is detected by the sensor 110.

The processor 140 may identify an object region including the detected object in the image, by using sensing data, an angle/viewing angle of the camera 120 that captures the image, a time point at which the image is captured, and the like. In an embodiment, the processor 140 may use at least one artificial intelligence model trained to detect the object region from the image.

If the detected object is identified as the floor object, the processor 140 may warp the object region in the image based on distance information of the object region.

The distance information refers to a distance between a specific portion of an object represented by each pixel in the image (or an object region) and the electronic apparatus 100 and/or the camera 120. The processor 140 may acquire the distance information through the sensor 110. In an embodiment, the sensor 110 may be implemented as a threedimensional (3D) sensor, a light detection and ranging (LiDAR) sensor, an ultrasonic sensor, and the like.

The warping may refer to an operation of correcting an image by rotating the image in an X-axis and/or a Y-axis or using scaling or the like. When the warping is performed, a position of each pixel in the image may be transformed by using a predetermined position transform function or the like.

Specifically, the processor 140 may acquire distance information of each of a plurality of pixels constituting the object region including the floor object, and may transform positions of the plurality of pixels based on the acquired distance information.

As a result, among a plurality of regions included in the object region, a region farther than a reference distance from the electronic apparatus 100 and/or the camera 120 may be scaled up, and a region closer than the reference distance from the electronic apparatus 100 and/or the camera 120 may be scaled down. A more detailed description will be described later with reference to FIG. 4 and the like.

The processor 140 may identify an object included in the warped object region. In an embodiment, the processor 140 may identify the object by inputting the warped object region into an artificial intelligence model 135 stored in the memory 130. The artificial intelligence model 135 may be a model trained to identify an object included in an image when the image (e.g., an object region in the image) is input.

Specifically, the processor 140 may acquire information on the floor object included in the object region by loading the artificial intelligence model 135 stored in the memory 130 into a volatile memory included in the processor 140 or connected to the processor 140 and inputting the warped object region into the loaded artificial intelligence model 135.

The sensor 110 may detect a surrounding object of the electronic apparatus 100. The processor 140 may detect the surrounding object of the electronic apparatus 100 based on the sensing data generated by the sensor 110.

The camera 120 may acquire one or more images of the surrounding of the electronic apparatus 100. The camera 120 may be implemented as a red, green, and blue (RGB) camera, a depth camera, or the like.

Various information related to functions of the electronic apparatus 100 may be stored in the memory 130. The memory 130 may include a read-only memory (ROM), a random access memory (RAM), a hard disk, a solid state drive (SSD), a flash memory, and the like.

The artificial intelligence model 135 trained to identify the object may be stored in the memory 130. When an image is input to the artificial intelligence model 135, the artificial intelligence model 135 may acquire information (e.g., name, type, product name, person name, and the like) on the object from the input image.

Specifically, when an image corresponding to an object region including an object is input to the artificial intelligence model 135, the artificial intelligence model 135 may operate as a classifier that selectively outputs information corresponding to an the object included in the object region among information output by the artificial intelligence model 135.

The processor 140 may be connected to the sensor 110, the camera 120, and the memory 130 to control the electronic apparatus 100.

Figure 2B:
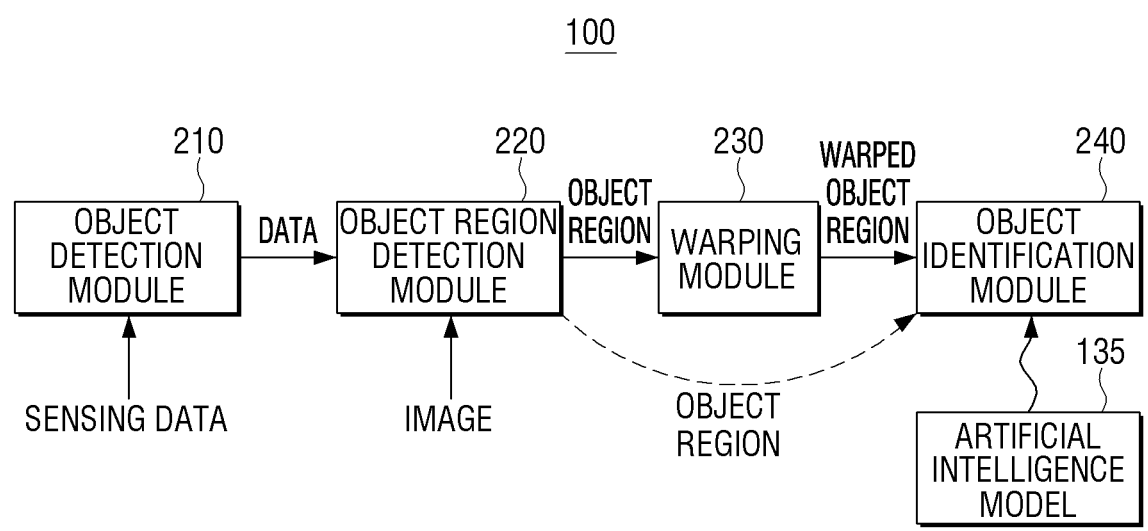
FIG. 2B is a block diagram illustrating a functional configuration of an electronic apparatus according to an embodiment.

FIG. 2B is a block diagram illustrating a functional configuration of an electronic apparatus according to an embodiment.

Referring to FIG. 2B, the electronic apparatus 100 may include an object detection module 210, an object region detection module 220, a warping module 230, and an object identification module 240. One or more of these modules 210-240 may be implemented to be stored in software form on the memory 130 and executed by the processor 140, or controlled by the processor 140 in the form of hardware including circuits. In addition, the modules 210-240 may be implemented in a combination of software and hardware to be executed and/or controlled by the processor 140. The configuration of the electronic apparatus 100 is not limited to the aforementioned components, and some components may be added, omitted, or merged depending on needs. For example, referring to FIG. 2D, the electronic apparatus 100 may not include the object region detection module 220 among the above-described modules 210-240.

Hereinafter, the operation of each module and the processor 140 will be described.

The processor 140 may detect an object around the electronic apparatus 100 through the object detection module 210. The object detection module 210 may detect an object by using sensing data received from the sensor 110.

As an example, the object detection module 210 may identify the floor by using sensing data from the sensor 110 such as, for example, a LiDAR sensor, an ultrasonic sensor, a 3D sensor, an infrared sensor, and the like, and may detect an object having a certain distance or depth from the floor.

Here, the object detection module 210 may identify a direction and a position of the detected object with respect to the electronic apparatus 100. In addition, the object detection module 210 may also identify a size or a height of the detected object by using the sensing data.

The object detection module 210 may use an algorithm or one or more artificial intelligence models for detecting the floor, obstacles (e.g., walls, objects, and the like), respectively, based on sensing data of the sensor 110.

The object region detection module 220 may detect an object region including the detected object among images acquired through the camera 120.

Specifically, the object region detection module 220 may identify, within an image, an object region (e.g., pixels) matching the direction, position, and size of the object detected based on the sensing data from the sensor 110.

To this end, the object region detection module 220 may use relative positions of the camera 120 and the sensor 110, the angle/viewing angle of the camera 120 at a time point at which the image is captured, and the like.

The warping module 230 is a component for warping at least one object region or image according to distance information of the object region or image.

The warping module 230 may transform a position of each of the pixels in the object region based on distance information of each of the pixels included in the object region or the image. Specifically, the warping module 230 may transform the position of each of the pixels in the object region so that the distance information of each of the pixels in the object region matches a reference distance.

As a result, each of a plurality of regions included in the object region or included in the image may be individually scaled up or scaled down according to distance information of each of the plurality of regions.

The object identification module 240 is a component for identifying an object included in the object region. Specifically, when the artificial intelligence model 135 stored in the memory 130 is loaded onto the volatile memory of the processor 140, the object region may be input to the loaded artificial intelligence model 135 to identify the object.

The processor 140 may warp an object region including an object, which is identified as the floor object, according to distance information of the object region and input the warped object region into the artificial intelligence model 135, and may input an object region including an object identified as not the floor object into the artificial intelligence model 135 without performing warping according to distance information thereof.

However, while the processor 140 may not perform the 'warping' on the object region including the object identified as not the floor object, the processor 140 may perform minimal pre-processing (e.g., full-size scaling) for inputting the object region including the object identified as not the floor object into the artificial intelligence model 135.

Figure 2C:
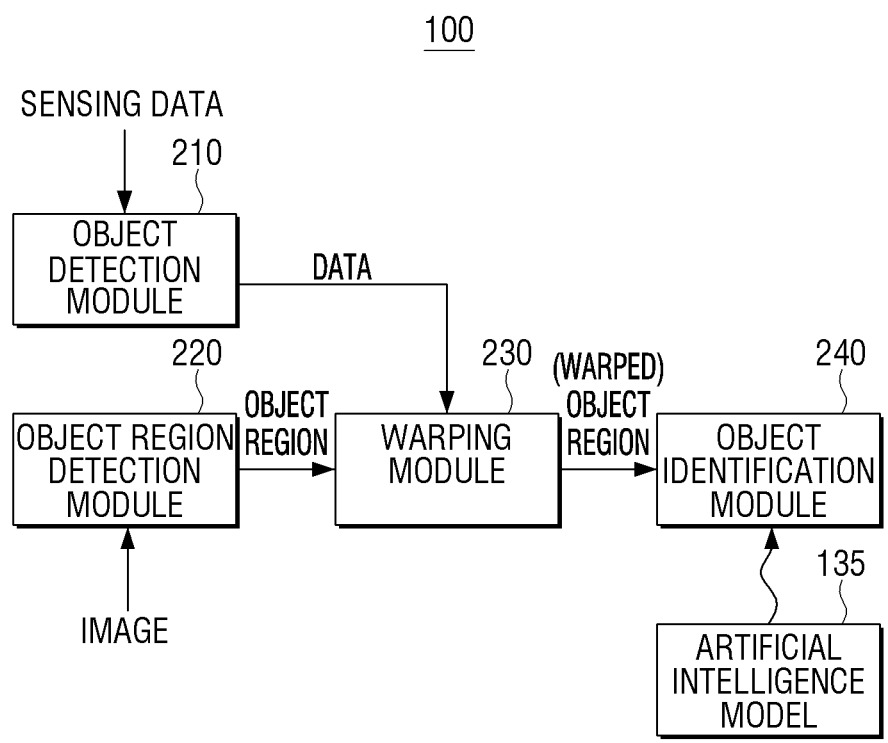
FIG. 2C is a block diagram illustrating a functional configuration of an electronic apparatus according to an embodiment.

On the other hand, referring to FIG. 2C, the operation of the object detection module 210 and the object region detection module 220 may be performed independently of each other.

In this case, the object detection module 210 may detect the object using the sensing data received through the sensor 110 and identify whether the detected object is the floor object. In an embodiment, the object detection module 210 may detect the object using a depth image acquired through a 3D sensor or the like included in the sensor 110. In this case, the object detection module 210 may use an artificial intelligence model trained to detect the object from the depth image.

In an embodiment, the object detection module 210 may identify a height of the object detected through an ultrasonic sensor or the like included in the sensor 110, and identify whether the object is the floor object based on the identified height.

The object region detection module 220 may identify the object region including the object from the image acquired through the camera 120. In this case, the camera 120 may be implemented as an RGB camera, and the object region detection module 220 may use an artificial intelligence model trained to identify the object region from an RGB image.

The warping module 230 may identify an object that matches the object region identified through the object region detection module 220 among objects detected through the object detection module 210.

As an example, the warping module 230 may identify an object matching the identified object region by comparing a depth image including the detected object among depth images acquired through the sensor 110 (e.g., a 3D sensor) with the RGB image acquired through the camera 120, but is not limited thereto.

In addition, if the object matching the object region is identified as the floor object, the warping module 230 may warp the object region according to distance information of the object region.

The object identification module 240 may identify the object (e.g., a type of the object) that is included in the warped object region.

Figure 2D:
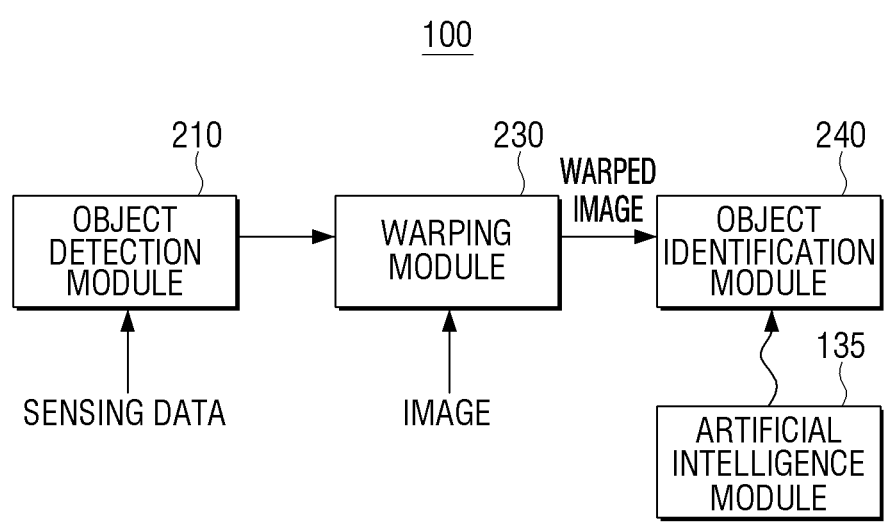
FIG. 2D is a block diagram illustrating a functional configuration of an electronic apparatus according to an embodiment.

Referring to FIG. 2D, the electronic apparatus 100 may not include the object region detection module 220.

Here, if the detected object is identified as the floor object, the processor 140 may warp an entire image including the floor object according to distance information using the warping module 230. In addition, the processor 140 may input the warped image into the object identification module 240 to identify the floor object in the image.

On the other hand, when the detected object is identified as not the floor object, the processor 140 may input an unwarped image into the object identification module 240 to identify the object in the image.

Hereinafter, an embodiment of the electronic apparatus operating using the modules of FIG. 2A described above will be described in detail with reference to FIGS. 3A, 3B, 3C, and 3D.

Figure 3A:
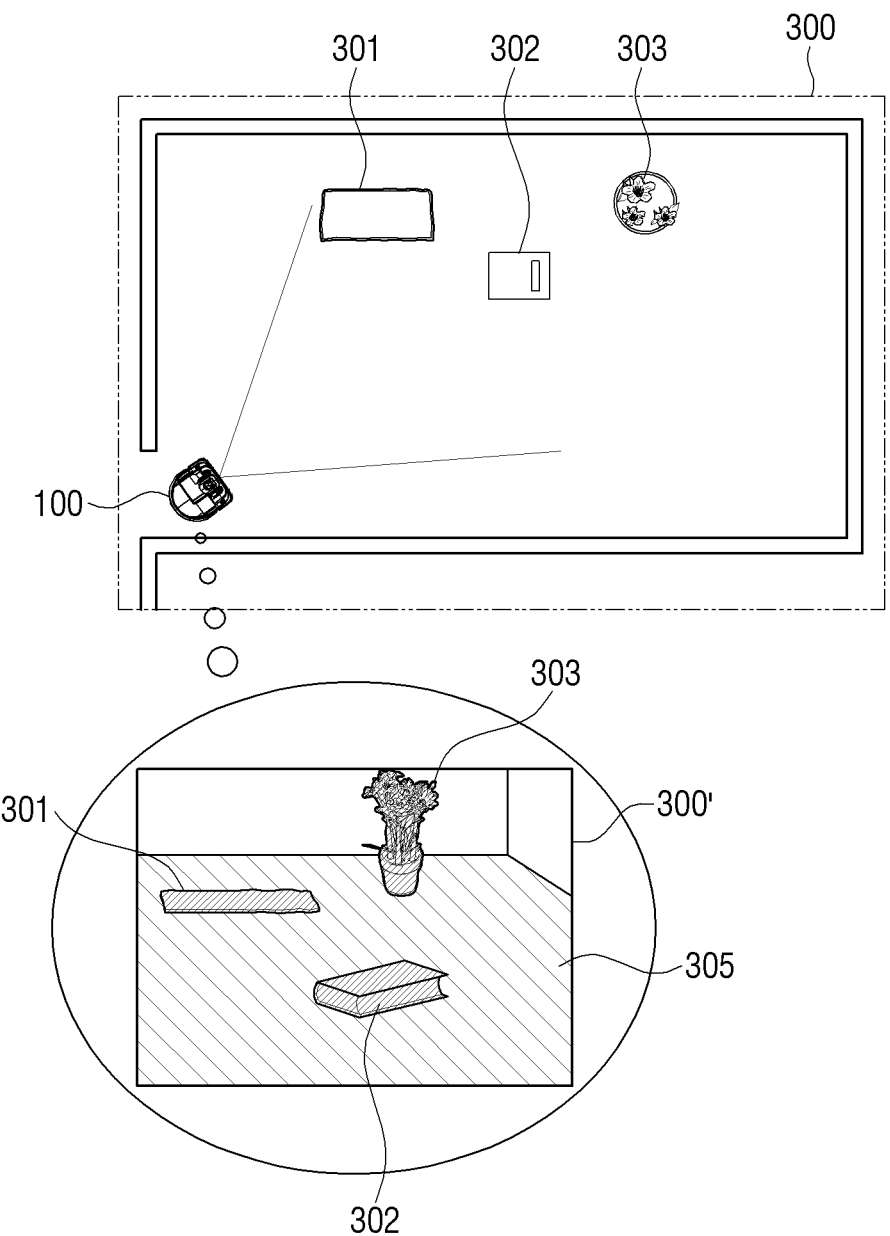
FIG. 3A is a diagram illustrating an example of detecting an object by using a sensor, in an electronic apparatus according to an embodiment.

FIG. 3A is a diagram illustrating an example in which an electronic apparatus according to an embodiment detects objects through a sensor.

Referring to FIG. 3A, the electronic apparatus 100 implemented as a robot cleaner may be driven in a specific space 300. Referring to FIG. 3A, a defecation pad 301, a book 302, and a flowerpot 303 are positioned on the space 300.

During driving, the electronic apparatus 100 may detect a floor or an obstacle around the electronic apparatus 100 through the sensor 110 implemented as, for example, an ultrasonic sensor, a LiDAR sensor, or the like. An image 300' of FIG. 3A illustrates an image of a surrounding of the electronic apparatus 100 detected by the electronic apparatus 100 according to the sensing data of the sensor 110.

Referring to FIG. 3A, the electronic apparatus 100 may detect a floor 305 by recognizing points placed on a plane such as a ground on which the electronic apparatus 100 is placed, based on the sensing data.

In addition, the electronic apparatus 100 may detect objects 301, 302, and 303, respectively, having a distance or depth distinguished from the floor 305. The electronic apparatus 100 may also detect points corresponding to a wall.

The object detection module 210 may use the sensing data received from the sensor 110 to identify the position, size, height, and/or approximate shape of the detected object. In particular, the object detection module 210 may detect a height of each of the objects 301, 302, and 303 from the floor 305.

To this end, the sensor 110 may include a plurality of LiDAR sensors and/or a plurality of ultrasonic sensors arranged on the electronic apparatus 100 at a predetermined interval.

Figure 3B:
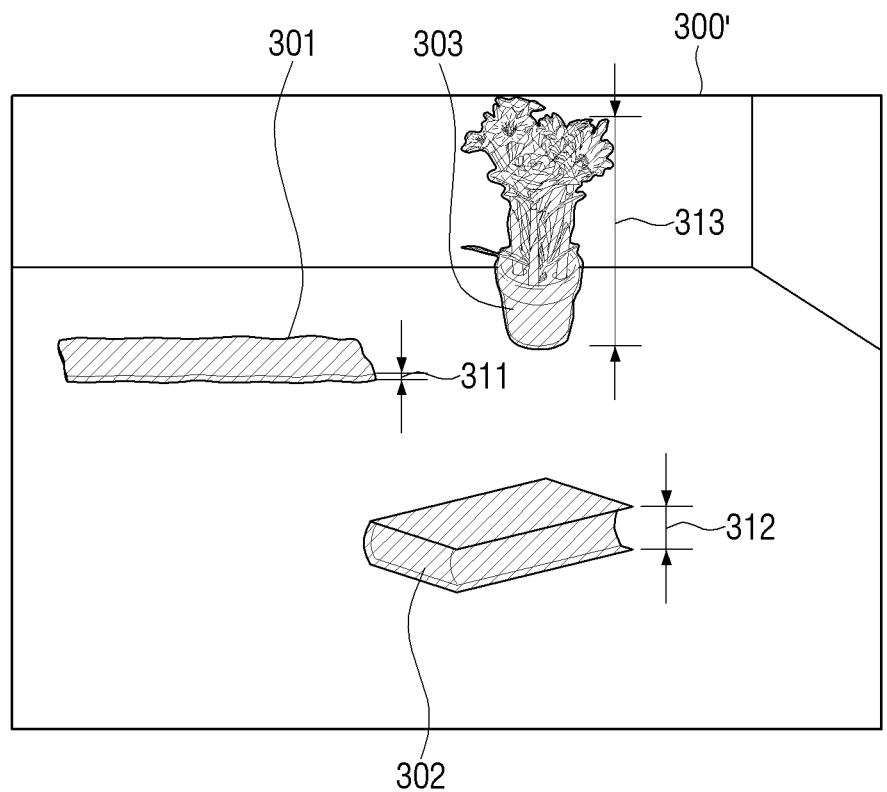
FIG. 3B is a diagram illustrating an example of identifying a height of a detected object from a floor, in an electronic apparatus according to an embodiment.

Referring to FIG. 3B, the object detection module 210 may identify heights 311, 312, and 313 from the floor of each of the objects 301, 302, and 303 based on the sensing data.

Here, the processor 140 may identify the object 301 of which a height is less than a threshold value among the objects 301, 302, and 303 as the floor object, and may identify the objects 302 and 303 of which heights are equal to or greater than the threshold value as not the floor object.

The threshold value may be a height that the electronic apparatus 100 may cross or climb over by using a moving means. For example, in an embodiment in which the electronic apparatus 100 is a robot cleaner and a diameter of a wheel, which is the moving means of the electronic apparatus 100, is 4 cm, the threshold value may be set to be 4 cm or may be set to be a slightly larger value (e.g., 6 cm) than the diameter of the wheel, for example, in consideration of a possible error in the identified height of an object.

Figure 3C:
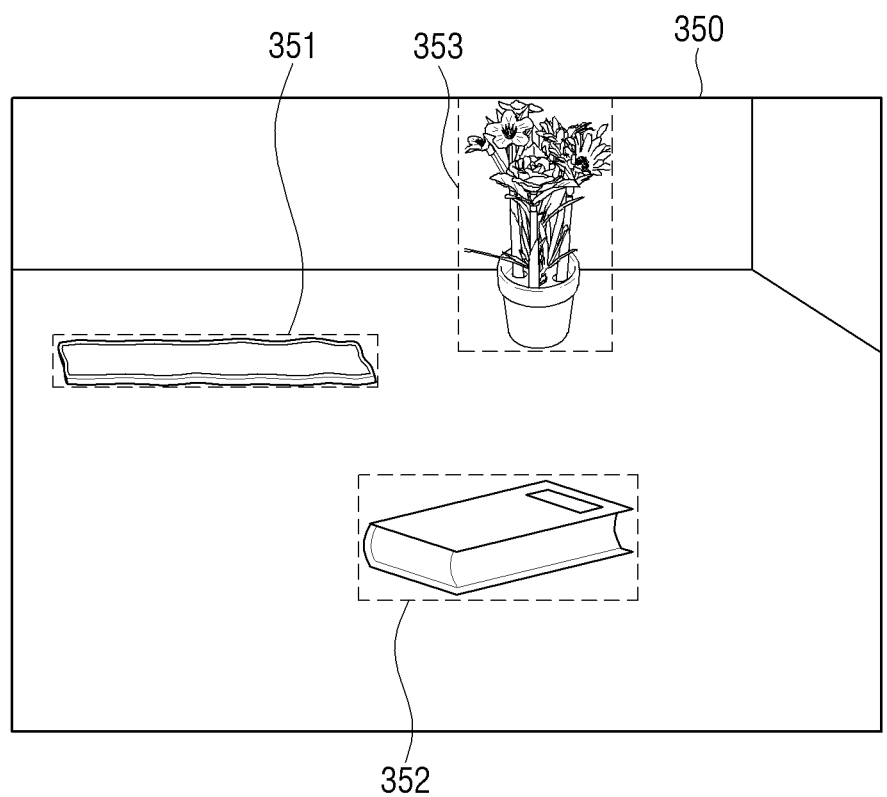
FIG. 3C is a diagram illustrating an example of identifying an object region from an image acquired through a camera, in an electronic apparatus according to an embodiment.

Referring to FIG. 3C, the object region detection module 220 may extract object regions 351, 352, and 353, respectively according to the position, size, and approximate shape of each of the detected objects 301, 302, and 303 from an image 350 acquired through the camera 120.

Figure 3D:
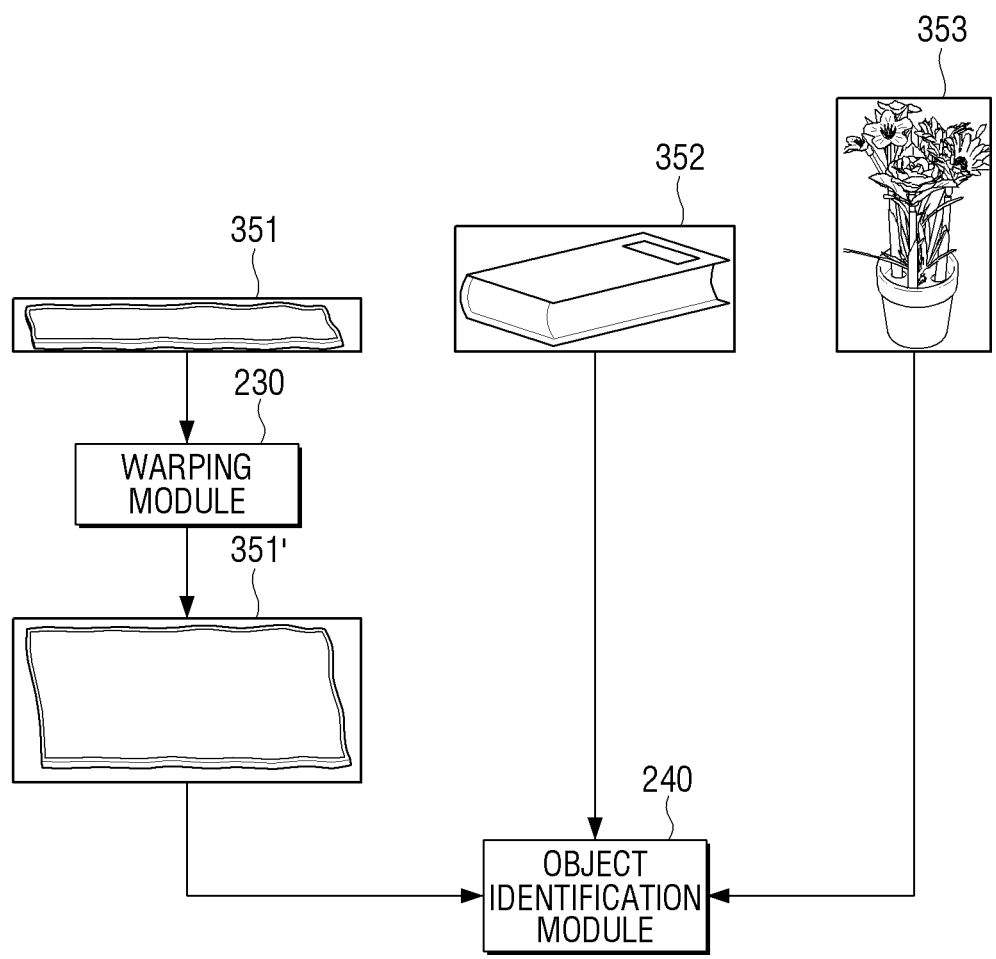
FIG. 3D is a diagram illustrating an example of identifying an object by selectively warping an object region according to whether the object is a floor object, in an electronic apparatus according to an embodiment.

In addition, referring to FIG. 3D, the warping module 230 may warp the object region 351, including the object 301 that is identified as the floor object among the objects 301, 302, and 303, according to distance information of the object region 351.

On the other hand, the warping module 230 may not warp the object regions 352, 353 of the objects 302 and 303.

Referring to FIG. 3D, the shape of the defecation pad in a warped object region 351' is generally enlarged as compared to before warping and a visible angle at which the defecation pad is visible is corrected, and therefore, a high object recognition rate and/or a high object recognition accuracy may be achieved. A warping method according to an embodiment will be described later with reference to FIGS. 4, 5A, 5B, and 6.

Referring to FIG. 3D, the object identification module 240 may identify an object included in the warped object region 351' and the object regions 352 and 353, respectively.

Here, the object identification module 240 may input the object regions 351', 352, and 353 into the artificial intelligence model 135, respectively, to identify the defecation pad 301, the book 302, and the flowerpot 303 included in each of the object regions 351', 352, 353.

When the electronic apparatus 100 does not include the object region detection module 220 as illustrated in FIG. 2D, the processor 140 may not perform extraction of the object region 351 as illustrated in FIGS. 3C and 3D.

In this case, the processor 140 may warp the image 350 itself including the floor object according to distance information of the image 350 using the warping module 230. In addition, the processor 140 may input the warped image into the object identification module 240 to identify the floor object in the image 350.

Hereinafter, an example method of the warping module 230 warping the object region of the floor object according to the distance information will be described with reference to FIGS. 4, 5A, 5B, and 6.

In warping the object region, the processor 140 may transform the positions of pixels included in the object region according to the reference distance.

Specifically, the processor 140 may acquire distance information of each of a plurality of pixels constituting the object region, and may transform the positions of the plurality of pixels based on the acquired distance information.

As a result, among a plurality of regions included in the object region, a region farther than the reference distance from the electronic apparatus 100 and/or the camera 120 may be scaled up, and a region closer than the reference distance from the electronic apparatus 100 and/or the camera 120 may be scaled down.

The reference distance may be predetermined by a manufacturer or a user of the electronic apparatus 100. In this case, the reference distance may be predetermined within a distance range in which the artificial intelligence model 135 stored in the memory 130 may identify the object, and may be experimentally determined. For example, if an object recognition rate of the artificial intelligence model 135 is relatively high when an image of an object captured at a distance between approximately 1 m and 3 m from the object is input, the reference distance may be predetermined to 2 m, that is obtained by averaging a minimum value and a maximum value of the distance range of 1 m and 3 m.

Alternatively, the reference distance may correspond to a distance of a region corresponding to a focus. That is, the processor 140 may set a distance of a region in which the focus of the camera 120 is positioned in the image including the object region as the reference distance. In an embodiment, at least a portion of the processor 140 and the camera 120 may be implemented in the same manner as a general auto-focusing camera.

Alternatively, the reference distance may be set as a distance of a pixel having the closest distance from the electronic apparatus 100 and/or the camera 120 among the plurality of pixels constituting the object region. In this case, the corresponding pixel having the closest distance is set as a reference pixel, and as a result, the object region may be enlarged as a whole.

Figure 4:
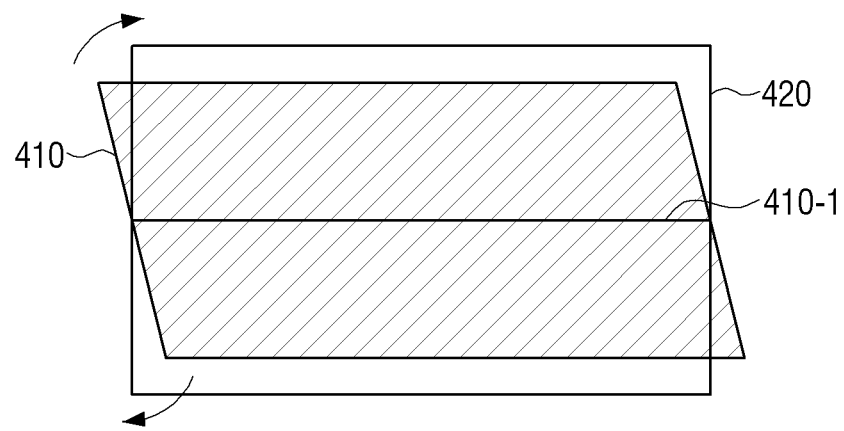
FIG. 4 is a diagram illustrating a method of warping an image according to a reference distance, in an electronic apparatus according to an embodiment.

FIG. 4 is a diagram illustrating a method of warping an image (e.g., an object region of a floor object) according to a reference distance, in an electronic apparatus according to an embodiment.

The processor 140 may identify a reference pixel corresponding to the reference distance among the plurality of pixels constituting the object region, and may identify a first pixel having a distance farther than the reference distance and a second pixel having a distance closer than the reference distance among the plurality of pixels.

In addition, the processor 140 may transform a position of the first pixel such that a distance between the first pixel and the reference pixel is increased, and may transform a position of the second pixel such that a distance between the second pixel and the reference pixel is decreased.

Referring to FIG. 4, as a result of warping an object region 410 by the processor 140, a warped object region 420 is obtained. Prior to the warping, the object region 410 includes an upper portion and a lower portion relative to a reference line 410-1, the reference line 410-1 including the reference pixel corresponding to the reference distance. Pixels in the upper portion of the object region 410 may be farther far from the reference line 410-1, and pixels in the lower portion of the object region 410 may be closer to the reference line 410-1. As a result of warping, the upper portion and the lower portion of the object region 410 may be scaled up or down, and accordingly, an angle at which an object included in the object region 410 is visible may be improved (e.g., the viewing angle of the object is increased).

The reference line 410-1 may be a straight line that bisects the image while including at least one pixel corresponding to the reference distance or a line constituted by only pixels corresponding to the reference distance.

For ease of understanding, it may be conceptually interpreted that the upper portion above the reference line 410-1 rotates to appear closer and the lower portion below the reference line 410-1 rotates to appear farther away in the warped object region 420.

Among pixels included in the upper portion of the object region 410, pixels having a large distance difference from the reference line 410-1 are rotated at a greater extent to appear closer, and among pixels included in the lower portion of the object region, pixels having a large distance difference from the reference line 410-1 are rotated at a greater extent to be further away.

To this end, the processor 140 may transform the position of the first pixel such that the degree of an increase in an interval between the reference pixel and the first pixel after transformation increases as the difference between the reference distance and the distance of the first pixel increases.

In addition, the processor 140 may transform the position of the second pixel such that the degree of a decrease in an interval between the reference pixel and the second pixel after transformation increases as a difference between the reference distance and the distance of the second pixel increases.

As a result, the degree to which each of the plurality of regions in the object region 410 is scaled up or down may be proportional to the distance between each of the plurality of regions and the reference line 410-1.

As such, as a result of adjusting an angle of perspective of the plurality of regions in the object region 410, the plurality of regions in a warped object region 420 may be provided as being flat and to appear as being located at the same distance (or nearly similar distances to each other).

In the embodiment of FIG. 4, for convenience of understanding, the reference line 410-1 is illustrated as the straight line, but it is also possible that the reference line 410-1 has a different form, e.g., a curved line. When the reference line 410-1 is the curved line, it is preferable that the curved line of the reference line has one pole (e.g., a concave curved line or a convex curved line). In this case, even if the warped object region is inversely transformed back to the object region before warping, the warped object region may be restored to the existing object region as it is.

In particular, in an embodiment in which an object recognition result based on the warped object region is provided together with an image including an object region that is not previously warped, the object region needs to be restored, and therefore, the reference line 410-1 needs to be a straight line or a curved line having one pole.

In an embodiment, depending on the difference between the distance of the closest pixel and the distance of the farthest pixel in the object region, the degree to which the plurality of regions in the image are scaled up or down as a result of warping may vary.

Figure 5A:
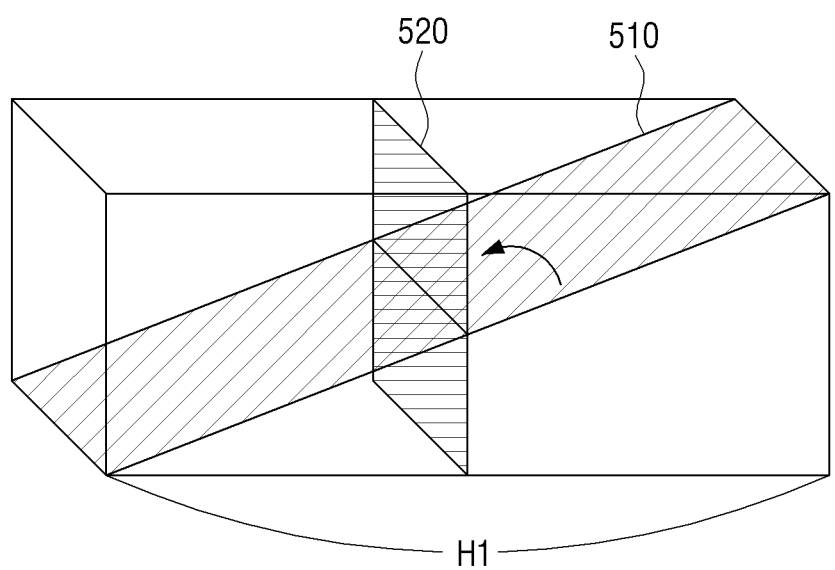
FIGS. 5A and 5B are diagrams illustrating examples in which a degree of warping is changed according to a difference between a distance of a closest pixel and a distance of a farthest pixel in an object region, according to an embodiment.
Figure 5B:
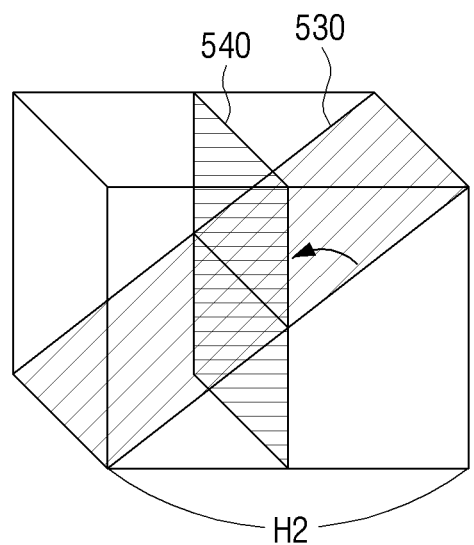

FIGS. 5A and 5B are diagrams illustrating that the degree to which the plurality of regions in the object region are scaled up or down by warping may vary, depending on the difference between the distance of the closest pixel and the distance of the farthest pixel in the object region. FIG. 5A illustrates a case in which the difference between the distance of the closest pixel and the distance of the farthest pixel in the object region is relatively large, and FIG. 5B illustrates a case in which the difference between the distance of the closest pixel and the distance of the farthest pixel in the object region is relatively small.

In the case of FIG. 5A, because the electronic apparatus 100 corrects an existing object region 510 having a large angle of perspective to a flat image 520, the degree to which an interval between pixels in the object region 510 increases or decreases (e.g., the degree to which a plurality of regions in the object region 510 are scaled up or down, proportional to a length of H1) as a result of warping changes is relatively large.

On the other hand, in the case of FIG. 5B, because the electronic apparatus 100 corrects an existing object region 530 having a small angle of perspective to a flat image 540, the degree to which an interval between pixels in the object region 530 increases or decreases (e.g., the degree to which a plurality of regions in the object region 530 are scaled up or down, proportional to a length of H2) as a result of warping changes is relatively small.

Figure 6:
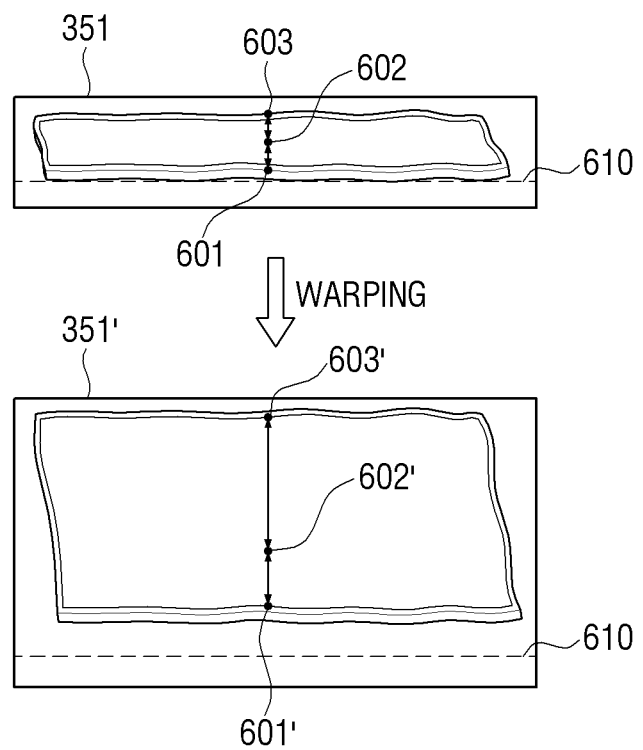
FIG. 6 is a diagram illustrating an example in which position transformation of pixels varies according to a difference between a reference distance and a distance of each of the pixels, according to an embodiment.

FIG. 6 is a diagram illustrating an example of warping the object region 351 including the object 301 identified as the floor object in FIG. 3D. Referring to FIG. 6, compared to a reference line 610 including a pixel corresponding to the reference distance, pixels displaying the object 301 correspond to pixels having a relatively longer distance, and therefore, a size of the object 301 in the object region 351 is generally enlarged by warping.

Referring to FIG. 6, a first interval between pixels 601 and 602 in the object region 351 before warping is equal to a second interval between pixels 602 and 603. The pixels 601, 602, and 603 in the object region 351 correspond to pixels 601', 602', and 603', respectively, on the warped object region 351'.

In FIG. 6, referring to the warped object region 351', the first interval and the second interval are increased by warping, respectively.

In addition, as a pixel has a large difference from the reference distance, the degree of an increase in the interval between the pixel and the reference line increases, and therefore, referring to FIG. 6, the second interval between the pixel 602' and the pixel 603' is greater than the first interval between the pixel 601' and the pixel 602' in the warped object region 351'.

In the case of the floor object that is relatively far from the electronic apparatus 100, such as the defecation pad 301 of FIG. 3A, there is a problem in the related art in that the recognition rate of the floor object is low because the height of the floor object is low. On the other hand, in the electronic apparatus 100 according to an embodiment, the recognition rate of the floor object may be improved by performing object identification using the above-described warping method.

The artificial intelligence model 135 may be trained to output information (e.g., the name or type of the object such as a defecation pad, a book, a flowerpot, and the like) on the object included in the object region. The artificial intelligence model 135 may also output a reliability value of the output information (e.g., a probability that the defecation pad is present on the floor).

In this case, the processor 140 may input the warped object region into the artificial intelligence model 135 to acquire the information on the object included in the warped object region and the reliability value of the information on the object.

If the acquired reliability value is less than a threshold value, the processor 140 may input an unwarped object region into the artificial intelligence model 135 to identify the detected object.

That is, the processor 140 may identify the floor object using a result obtained by inputting an object region having higher reliability of information output from the artificial intelligence model 135, among the warped object region and the unwarped object region into the artificial intelligence model 135.

In an embodiment, when the object detected based on the sensing data is identified as the floor object, the processor 140 may also perform object identification using a separate artificial intelligence model.

Figure 7A:
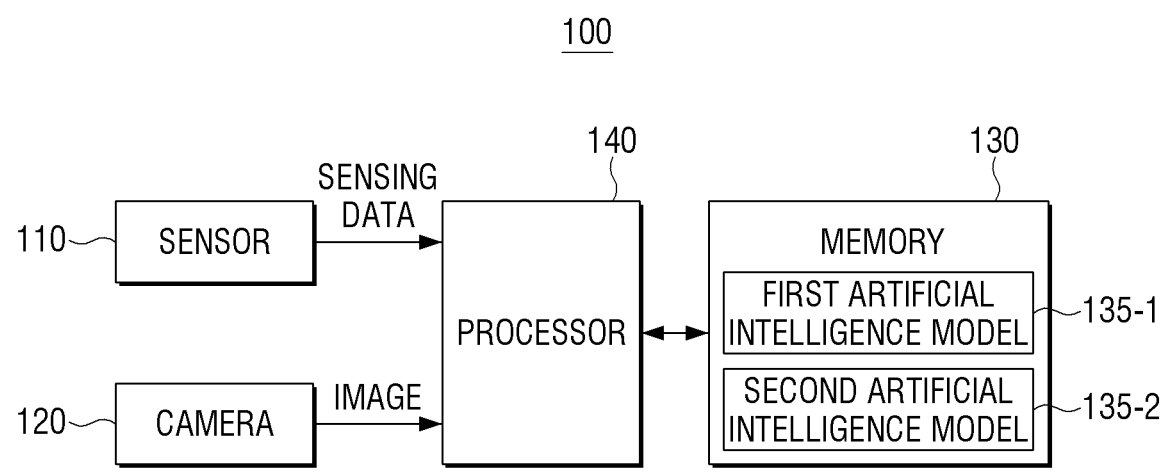
FIG. 7A is a block diagram illustrating a configuration of an electronic apparatus using an artificial intelligence model trained to identify a floor object according to an embodiment.

FIG. 7A is a block diagram illustrating a configuration of an electronic apparatus using an artificial intelligence model trained to identify a floor object according to an embodiment.

Referring to FIG. 7A, a plurality of artificial intelligence models 135-1 and 135-2 trained to identify the object may be stored in the memory 130.

Specifically, the first artificial intelligence model 135-1 may be a model trained to identify an object based on an image including an object, not a floor object, and the second artificial intelligence model 135-2 may be an artificial intelligence model trained to identify a floor object based on a plurality of images including the floor object.

The second artificial intelligence model 135-2 may be an artificial intelligence model trained to identify the floor object based on a plurality of images obtained by capturing the floor object at a relatively low angle.

Figure 7B:
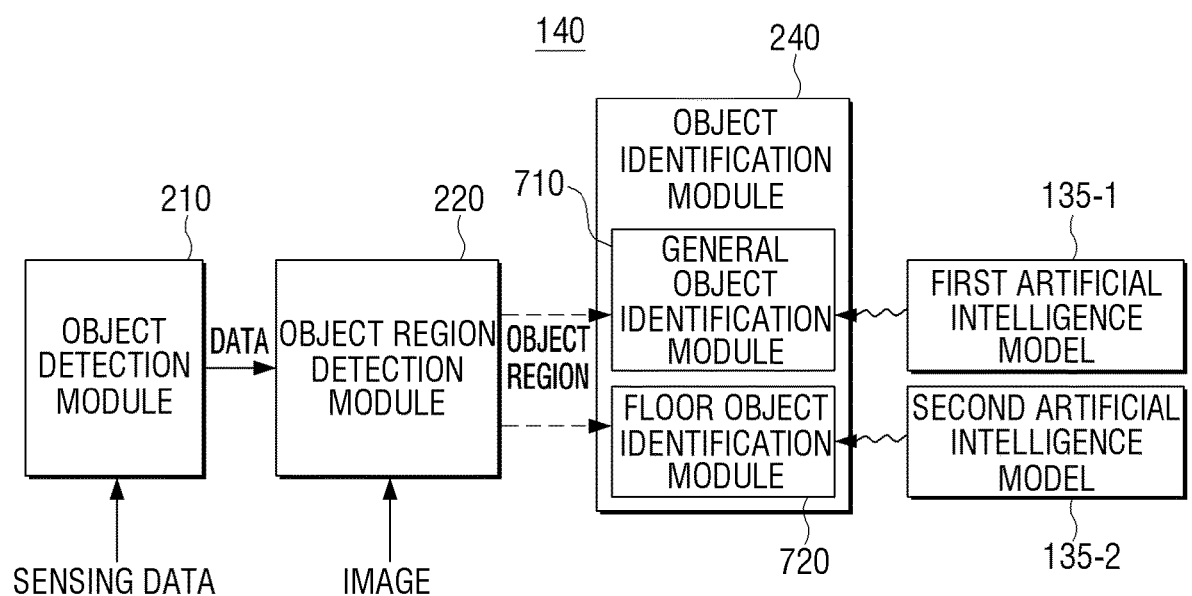
FIG. 7B is a block diagram illustrating an example of a functional configuration of the electronic apparatus of FIG. 7A.

FIG. 7B is a block diagram illustrating an example of a functional configuration of the electronic apparatus of FIG. 7A. Referring to FIG. 7B, the object detection module 210, the object region detection module 220, and the object identification module 240 may perform operations under the control of the processor 140.

First, the object detection module 210 may detect an object based on sensing data.

In addition, the object region detection module 220 may identify an object region including the detected object from the image acquired through the camera 120.

The object identification module 240 may include a general object identification module 710 for identifying an object that is not the floor object, and a floor object identification module 720 for identifying the floor object.

If it is identified that the detected object is not the floor object, the object identification module 240 may identify the object in the object region by using the general object identification module 710. The processor 140 may load only the first artificial intelligence model 135-1, among the first artificial intelligence model 135-1 and the second artificial intelligence model 135-2, onto the volatile memory of the processor 140, and input the object region into the loaded first artificial intelligence model 135-1.

On the other hand, if it is identified that the detected object is identified as the floor object, the object identification module 240 may identify the object in the object region by using the floor object identification module 720. The processor 140 may load only the second artificial intelligence model 135-2, among the first artificial intelligence model 135-2 and the second artificial intelligence model 135-2, onto the volatile memory of the processor 140, and input the object region into the loaded second artificial intelligence model 135-2.

Figure 8:
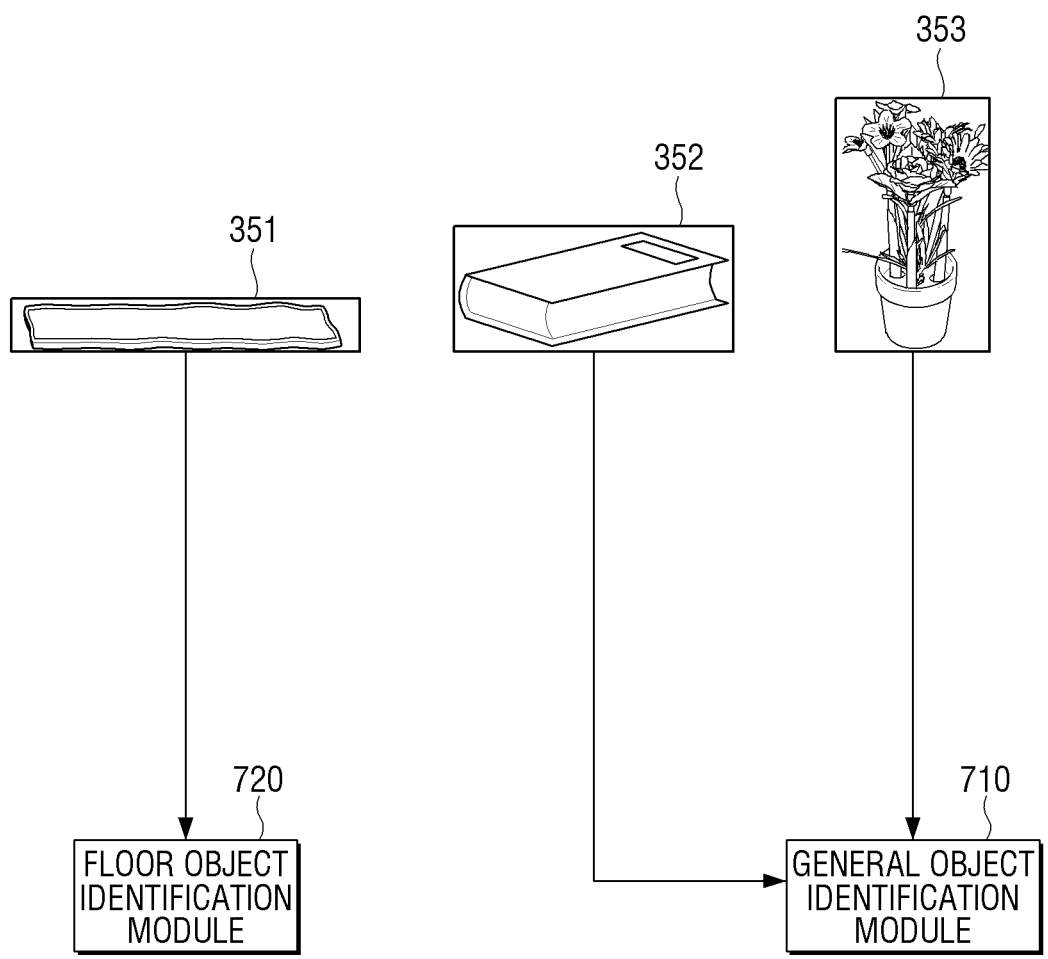
FIG. 8 is a diagram illustrating an example of using an artificial intelligence model according to whether a detected object is a floor object, in an electronic apparatus according to an embodiment.

FIG. 8 is a diagram illustrating an example in which an electronic apparatus according to an embodiment uses an artificial intelligence model according to whether the object is identified as the floor object.

Referring to FIG. 8, the processor 140 may differently process the object regions 351, 352, and 353 of FIG. 3C depending on whether the floor object is included therein.

Specifically, the processor 140 may perform object identification on the object region 351 including the floor object 301 by using the floor object identification module 720, and may perform object identification on the object regions 352 and 353 respectively including the objects 302 and 303 that are not the floor object by using the general object identification module 710.

The electronic apparatus 100 may also identify the floor object using a plurality of artificial intelligence models trained to identify the floor object for each distance of capturing the floor object.

Figure 9A:
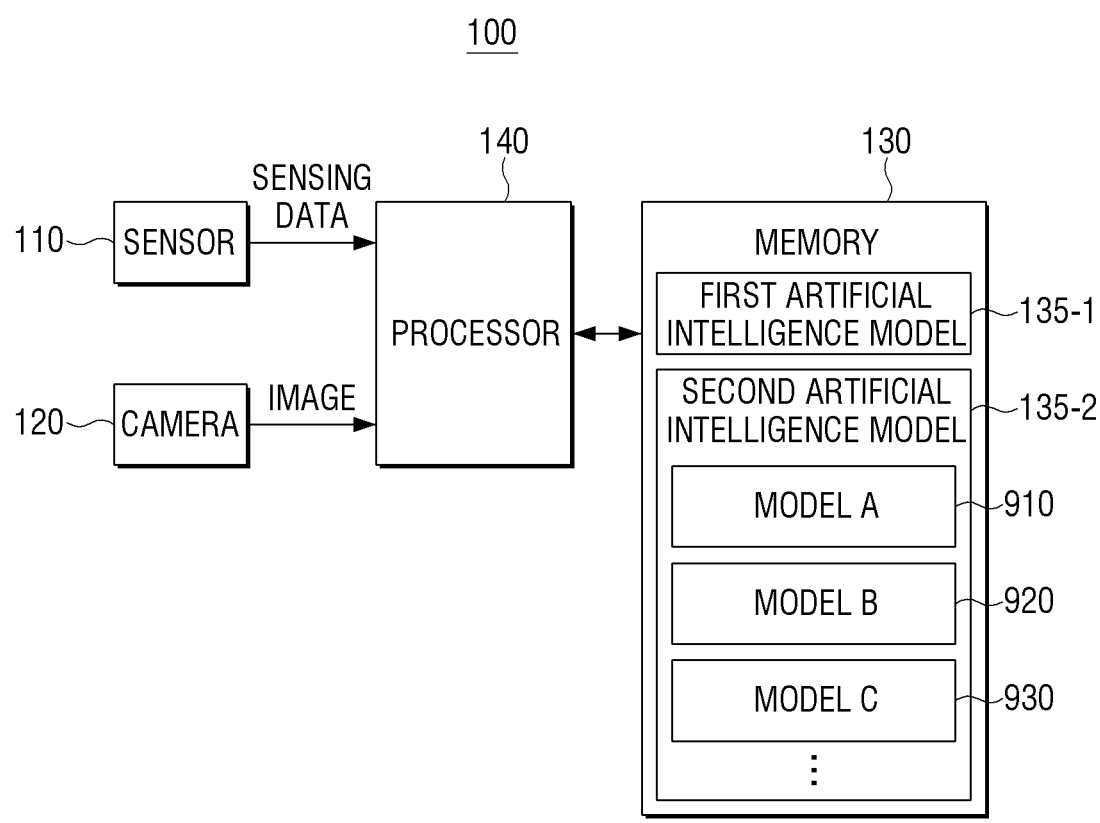
FIG. 9A is a block diagram illustrating an example of using a plurality of artificial intelligence models trained to identify a floor object for each distance at which the floor object is captured, in an electronic apparatus according to an embodiment.

FIG. 9A is a block diagram illustrating an example in which an electronic apparatus according to an embodiment uses a plurality of artificial intelligence models trained to identify a floor object for each distance of capturing the floor object.

Referring to FIG. 9A, the second artificial intelligence model 135-2 stored in the memory 130 may include a plurality of artificial intelligence models such as a model a 910, a model b 920, and a model c 930. The models 910, 920 930 may be models trained based on floor objects captured at different distances.

Figure 9B:
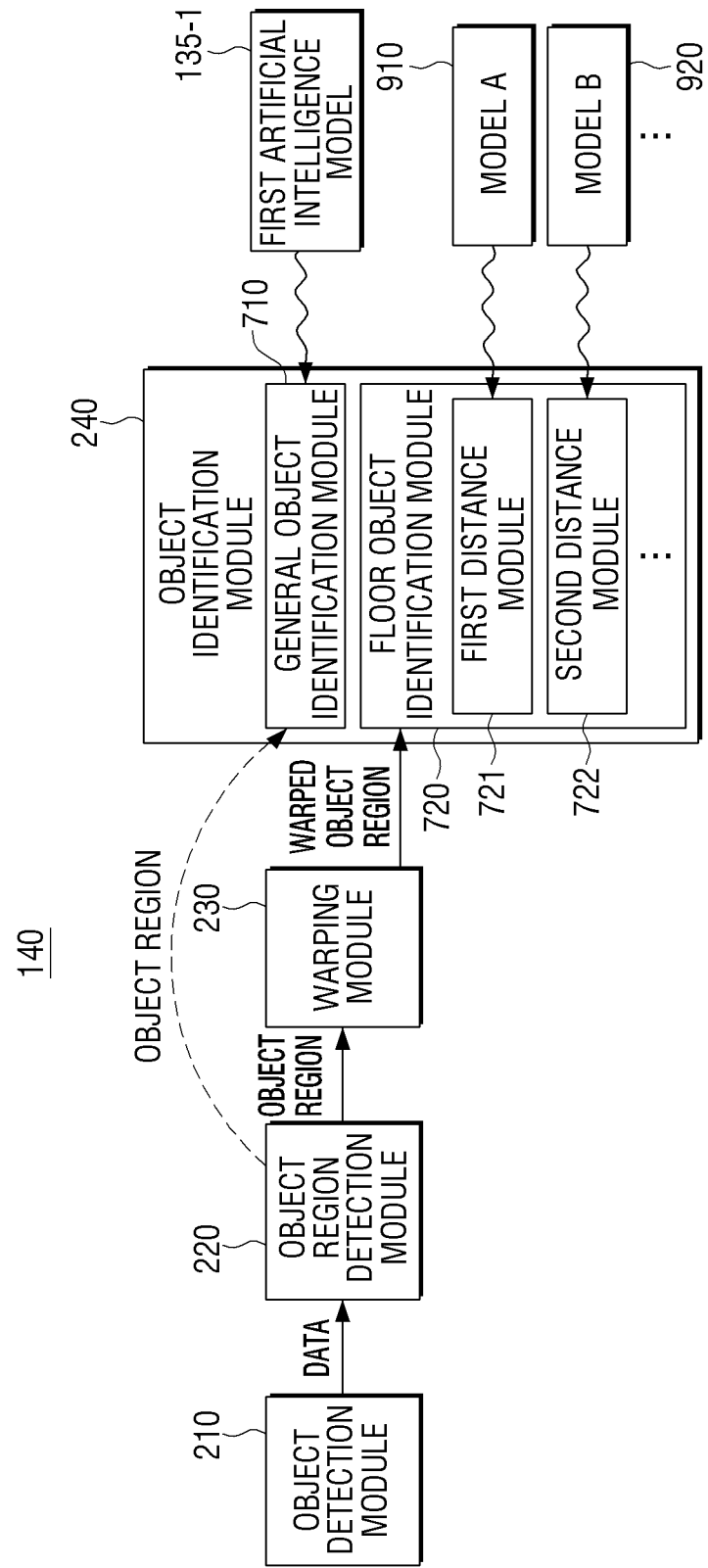
FIG. 9B is a block diagram illustrating an example of a functional configuration of the electronic apparatus of FIG. 9A.

FIG. 9B is a block diagram illustrating an example of a functional configuration of the electronic apparatus of FIG. 9A.

Referring to FIG. 9B, the object detection module 210, the object region detection module 220, the warping module 230, and the object identification module 240 including the general object identification module 710 and the floor object identification module 720 may perform operations under the control of the processor 140.

Specifically, the processor 140 may detect an object by using the object detection module 210. In addition, the processor 140 may extract an object region including the detected object from the image acquired through the camera 120, by using the object region detection module 220.

If the detected object is identified as not the floor object, the processor 140 may identify an object in the object region by using the general object identification module 710. The general object identification module 710 may use the first artificial intelligence model 135-1 to identify the object.

On the other hand, if the detected object is identified as the floor object, the processor 140 may warp the object region by using the warping module 230. In addition, the processor 140 may input the warped object region into the floor object identification module 720.

The floor object identification module 720 may include modules for identifying floor objects of different distances, such as a first distance module 721 and a second distance module 722. Specifically, the first distance module 721 may be a module for identifying a floor object captured at a first distance, and the second distance module 722 may be a module for identifying a floor object captured at a second distance different from the first distance.

The first distance module 721 may identify the object using the model a 910, and the second distance module 722 may identify the object using the model b 920.

The processor 140 may identify the floor object in the object region by selectively using a module for identifying a floor object of a distance corresponding to distance information of an object region before warping, among the modules for identifying floor objects of different distances included in the floor object identification module 720.

The distance information of the object region before warping may be an average of distances (e.g., distances between an object represented by each of the plurality of pixels and the electronic apparatus and/or the camera) of a plurality of pixels included in the object region, but is not limited thereto.

Figure 10:
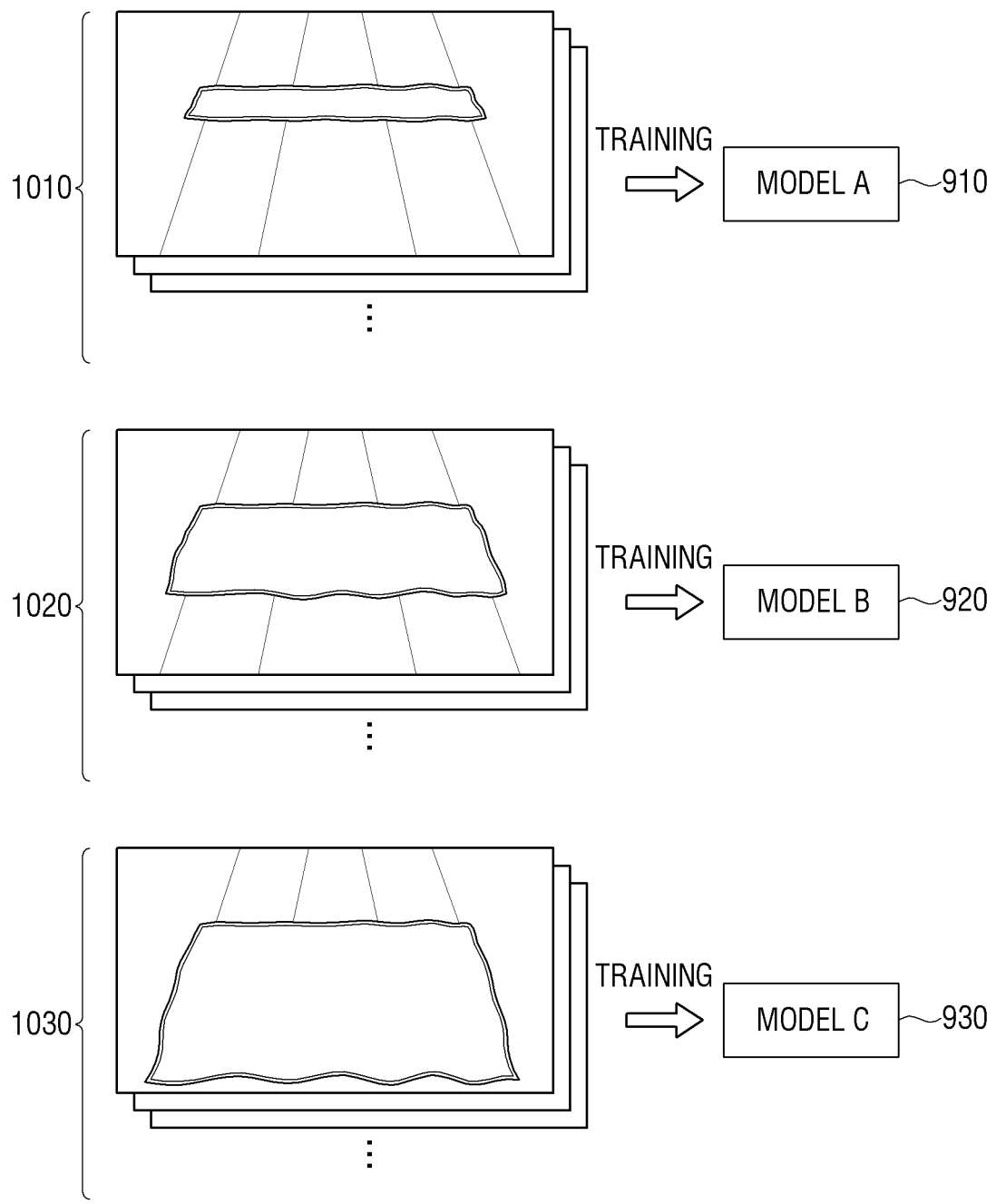
FIG. 10 is a diagram illustrating a training process of a plurality of artificial intelligence models stored in the electronic apparatus of FIG. 9A.

FIG. 10 illustrates a training process of the plurality of artificial intelligence models stored in the electronic apparatus of FIG. 9A.

Referring to FIG. 10, the model a 910 may be a model trained to identify the floor object based on images 1010 of the floor object (e.g., defecation pad) captured at a first distance, which is a relatively distant.

As a result, the model a 910 may more efficiently identify the floor object at the first distance.

The model b 920 may be a model trained to identify the floor object based on images 1020 of the floor object (e.g., defecation pad) captured at a second distance that is closer than the first distance.

In addition, the model c 930 may be a model trained to identify the floor object based on images 1030 of the floor object (e.g., defecation pad) captured at a third distance that is closer than the second distance.

The images 1010, 1020, and 1030 may be images obtained by capturing the floor object at different angles. The angles may be determined according to a floor reference height of the camera 120 in the electronic apparatus 100.

For example, when the electronic apparatus 100 is a robot cleaner and a height of the camera 120 from the floor is 5 cm, the images 1010 may be images obtained by capturing a floor object of the first distance at a height of 5 cm, the images 1020 may be images obtained by capturing a floor object of the second distance at a height of 5 cm, and the images 1010 may be images obtained by capturing a floor object of the third distance at a height of 5 cm.

Figure 11:
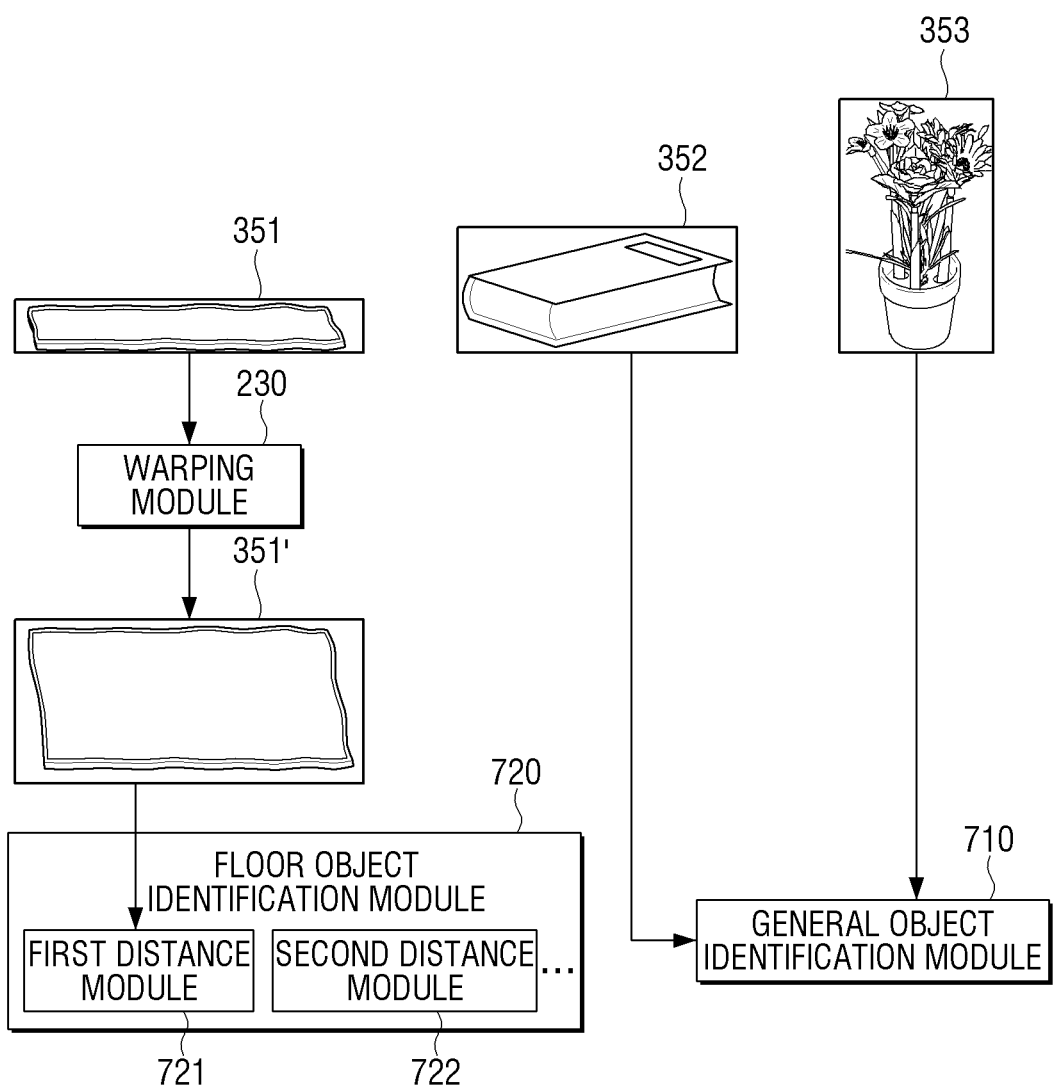
FIG. 11 is a diagram illustrating an example of using an artificial intelligence model according to whether an object is a floor object and distance information of the floor object, in an electronic apparatus according to an embodiment.

FIG. 11 is a diagram illustrating an example in which an electronic apparatus according to an embodiment selectively uses the models trained as illustrated in FIG. 10.

Referring to FIG. 11, the processor 140 may warp the object region 351 including the floor object using the warping module 230, and may identify an object in the warped object region 351 by using the floor object identification module 720.

In this case, if the object region 351 before warping corresponds to the first distance, the processor 140 may identify the object in the object region 351 by using the first distance module 721 of the floor object identification module 720.

The processor 140 may selectively load the model a 910, which may be a model trained to identify the floor object based on images of the floor object captured at the first distance, among the plurality of artificial intelligence models stored in the memory 130 onto the volatile memory of the processor 140.

In the case of the object regions 352 and 353 that do not include the floor object, the object identification may be performed by using the general object identification module 710 without performing warping.

Figure 12:
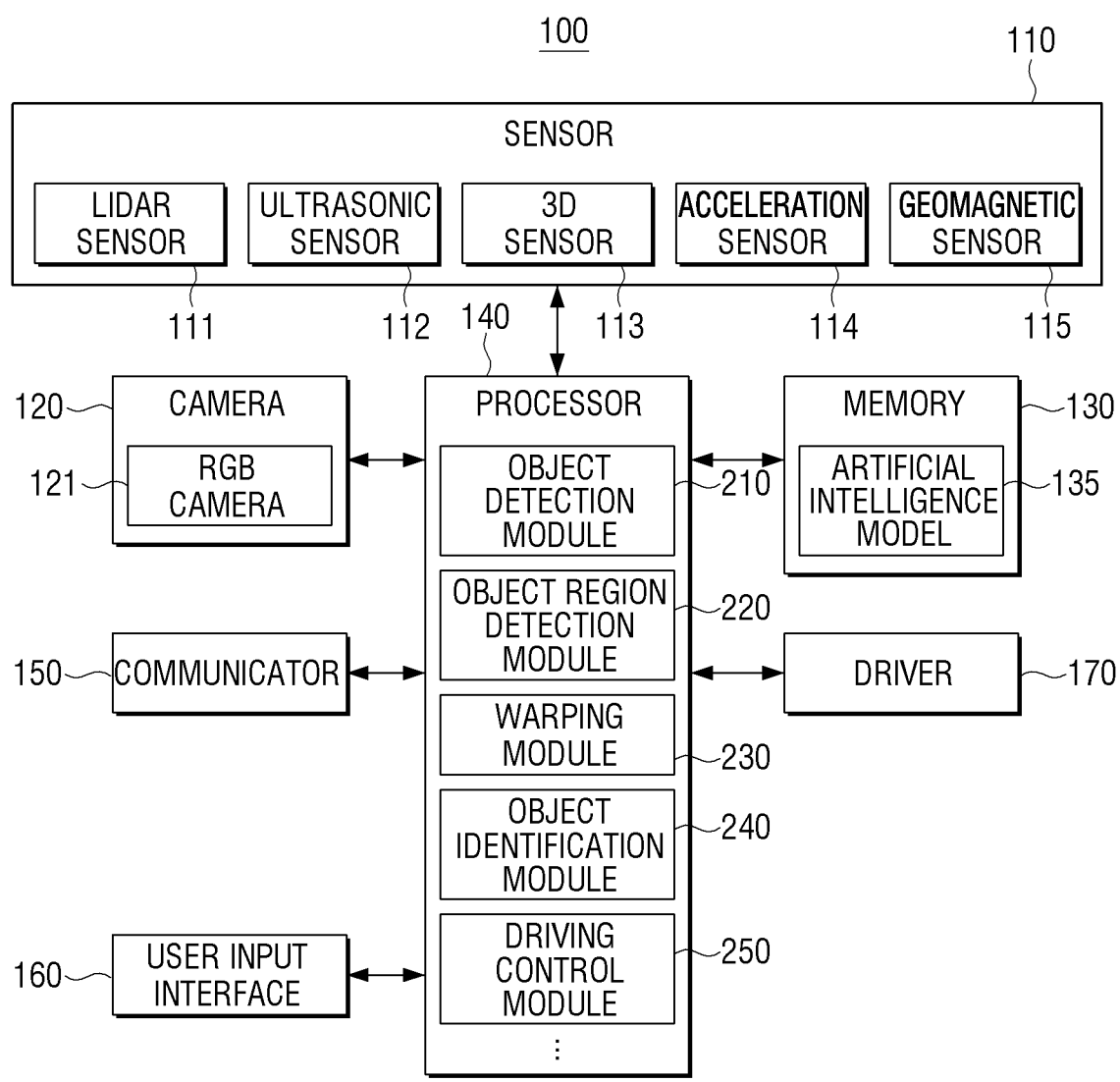
FIG. 12 is a block diagram illustrating a detailed configuration of an electronic apparatus according to various embodiments.

FIG. 12 is a block diagram illustrating a detailed configuration of an electronic apparatus according to embodiments.

Referring to FIG. 12, the electronic apparatus 100 may further include a communicator 150, a user input interface 160, a driver 170, and the like, in addition to the sensor 110, the camera 120, the memory 130, and the processor 140.

The sensor 110 may include a LiDAR sensor 111, an ultrasonic sensor 112, a 3D sensor 113, an acceleration sensor 114, a geomagnetic sensor 115, and the like.

The 3D sensor 133 may be implemented as a depth camera. The depth camera may be implemented as a time of flight (TOF) camera including a TOF sensor and an infrared light. The depth camera may measure a depth using a disparity of an image acquired using a plurality of cameras, and in this case, may include an IR stereo sensor. Alternatively, the depth camera may be implemented as a structured light method for measuring depth by capturing a light pattern projected by a projector having a camera.

The processor 140 may detect surrounding objects through the LiDAR sensor 111, the ultrasonic sensor 112, and the 3D sensor 113. In addition, the processor 140 may detect a moving direction, speed, and position of the electronic apparatus 100 by using the acceleration sensor 114 and the geomagnetic sensor 115.

The sensor 110 may include various sensors in addition to the sensors illustrated in FIG. 9.

The camera 120 may include an RGB camera.

The camera 120 may include a sensor such as a charge-coupled device (CCD) or a complementary metal-oxide semiconductor (CMOS), but is not limited thereto. When the camera 120 includes the CCD, the CCD may be implemented as a red/green/blue (RGB) CCD, an infrared (IR) CCD, or the like.

As described with reference to FIGS. 2A and 7A, one or more artificial intelligence models (e.g., artificial intelligence models 135, 135-1, and 135-2) may be stored in the memory 130. Specifically, one or more artificial intelligence models may be stored in a storage such as a hard disk or SSD of the memory 130.

Functions of the stored artificial intelligence models may be performed based on operations of the processor 140 and the memory 130.

To this end, the processor 140 may include one or a plurality of processors. Here, one or the plurality of processors may be a general-purpose processor such as a CPU, an AP, or the like, a graphic-dedicated processor such as a GPU, a VPU, or the like, or an artificial intelligence dedicated processor such as an NPU.

One or the plurality of processors perform a control to process input data according to predefined operation rules or artificial intelligence models stored in the memory 130. The predefined operation rules or artificial intelligence models are characterized by being created through training.

Here, the predefined operation rules or artificial intelligence models created through training refer to the predefined operation rules or artificial intelligence models having desired characteristics created by applying training algorithms to a large number of training data. Such training may be performed in a device itself in which the artificial intelligence according to an embodiment is performed, or may also be performed through a separate server/system.

The artificial intelligence model may include a plurality of neural network layers. Each layer has a plurality of weight values and a layer calculation is performed by calculating a calculation result of a previous layer and the plurality of weight values. Examples of the neural network include a convolutional neural network (CNN), a deep neural network (DNN), a recurrent neural network (RNN), a restricted boltzmann machine (RBM), a deep belief network (DBN), a bidirectional recurrent deep neural network (BRDNN), and deep Q-networks, and the neural network in the disclosure is not limited to the examples described above except as otherwise specified.

A learning algorithm may be used to train a predetermined target device (e.g., a robot) using a large number of learning data so that the predetermined target device may make a decision or predict itself. Examples of the learning algorithm include supervised learning, unsupervised learning, semi-supervised learning, or reinforcement learning, and the learning algorithm in the disclosure is not limited to the examples described above except as otherwise specified.

The processor 140 may perform various operations by executing/controlling the object detection module 210, the object region detection module 220, the warping module 230, the object identification module 240, and the driving control module 250. Each of the modules may be stored on the ROM of the memory 130 and/or implemented in a circuit form.

The communicator 150 is a component of the electronic apparatus 100 to communicate with at least one external device to exchange signals/data. To this end, the communicator 150 may include a circuit.

The communicator 150 may include a wireless communication module, a wired communication module, and the like.

To receive data (e.g., content) from an external server or external device, the wireless communication module may include at least one of a Wi-Fi communication module, a Bluetooth module, an infrared data association (IrDA) module, a third generation (3G) mobile communication module, a fourth generation (4G) mobile communication module, or a fourth generation long term evolution (LTE) communication module.

The wired communication module may be implemented as a wired port such as a Thunderbolt port or a universal serial bus (USB) port.

The processor 140 may transmit the object identification result obtained by using the object identification module 240 to an external device such as a server device via the communicator 150.

In addition, at least some of the artificial intelligence models stored in the memory 130 may be received by the electronic apparatus 100 from the external device, such as the server device, through the communicator 150.

According to a user input received through the user input interface 160, the processor 140 may control the driver 170 to move the electronic apparatus 100, and may perform the object identification while the electronic apparatus 100 is moving.

The user input interface 160 may include one or more buttons, a keyboard, a mouse, and the like. In addition, the user input interface 160 may include a touch panel implemented with a display (not illustrated) or a separate touch pad (not illustrated).

The user input interface 160 may also include a microphone to receive a command or information of the user by voice, and may be implemented together with the camera 120 to recognize the command or information of the user in a motion form.

The driver 170 is a component for moving the electronic apparatus 100. The driver 170 may include a moving means implemented with, for example, one or more wheels, an actuator for driving the moving means, and the like.

The processor 140 may control the driver 170 through the driving control module 250. The driving control module 250 may identify the moving speed, the moving direction, the position of the electronic apparatus 100 based on the sensing data of the acceleration sensor 114 and the geomagnetic sensor 115 included in the sensor 110, and may control the driver 170 based on the identified moving speed, moving direction, and position of the electronic apparatus 100.

The driving control module 250 may control the driver 170 according to whether the detected object is identified as the floor object and the object identification result.

If the detected object is identified as not the floor object that the electronic apparatus 100 may cross or climb over by using the driver 170, the driving control module 250 may control the driver 170 to move while avoiding the detected object.

If the detected object is identified as the floor object, the driving control module 250 may control the driver 170 differently according to the object identification result.

Specifically, if the detected floor object is a carpet or a threshold, the driving control module 250 may control the driver 170 to move while climbing over the detected object or crossing over the detected object. On the other hand, if the detected floor object is a defecation pad or a wire, the driving control module 250 may control the driver 170 to move while avoiding the detected object.

Figure 13A:
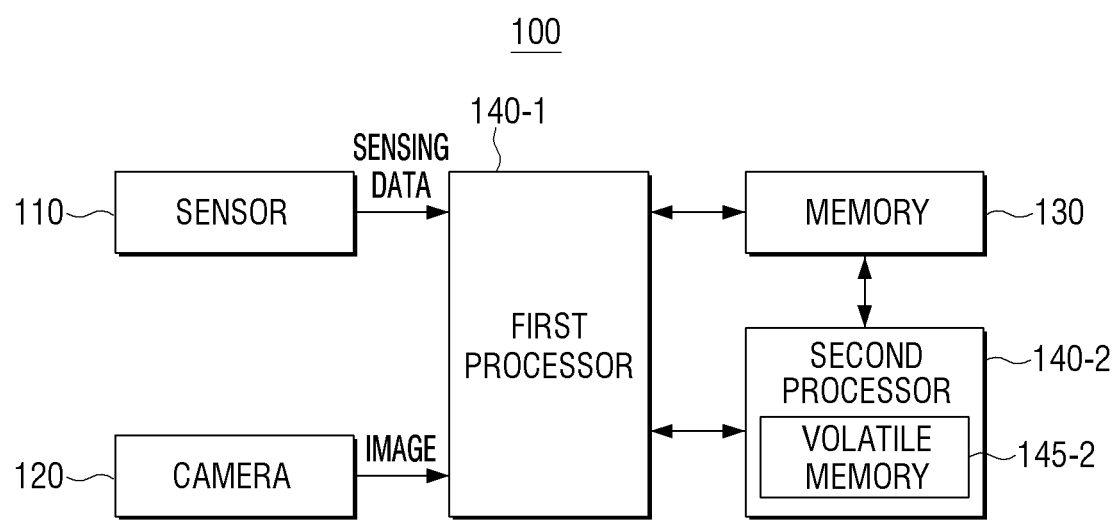
FIG. 13A is a block diagram illustrating a configuration of an electronic apparatus including a plurality of processors according to an embodiment.

FIG. 13A is a block diagram illustrating a configuration of an electronic apparatus including a plurality of processors according to an embodiment.

Referring to FIG. 13A, the electronic apparatus 100 may include a first processor 140-1 and a second processor 140-2.

The first processor 140-1 may be implemented as a main processor for controlling the overall operation of the electronic apparatus 100 by being connected to the sensor 110, the camera 120, and the like, and The first processor 140-1 may be implemented as a general-purpose processor such as a CPU or an AP, or a graphics-dedicated processor such as a GUP or VPU.

The second processor 140-2 may be implemented as a separate processor for performing object identification through the artificial intelligence models stored in the memory 130. The second processor 140-2 may be implemented as an NPU that is advantageous for learning and/or calculating the artificial intelligence models.

The second processor 140-2 may load at least one artificial intelligence model onto a volatile memory 145-2 when identifying the object, and input an object region into the loaded artificial intelligence model.

When the first artificial intelligence model 135-1 and the second artificial intelligence model 135-2 described above are included in the memory 130, the second processor 140-2 may receive information on whether the detected object is the floor object from the first processor 140-1. In addition, the second processor 140-2 may load the first artificial intelligence model 135-1 on the volatile memory 145-2 when the detected object is identified as not the floor object, and may load the second artificial intelligence model 135-2 onto the volatile memory 145-2 when the detected object is identified as the floor object.

Figure 13B:
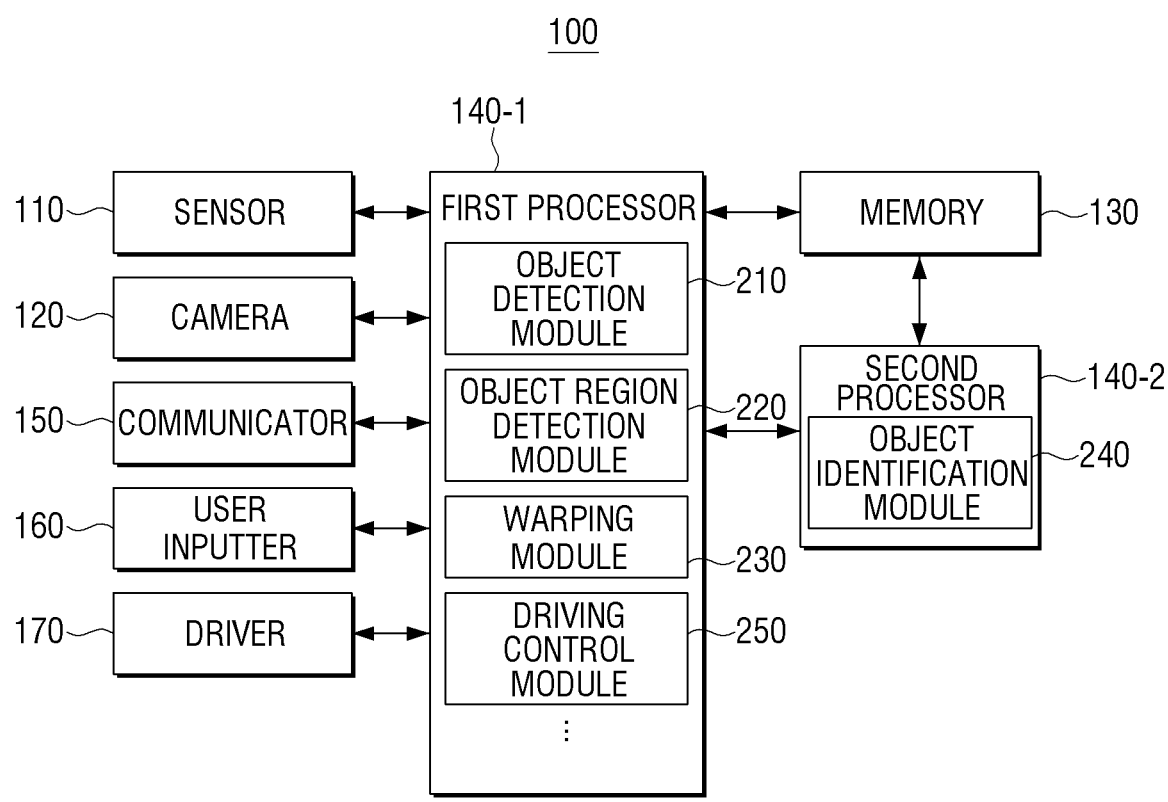
FIG. 13B is a block diagram illustrating an example of a more detailed configuration of the electronic apparatus of FIG. 13A.

FIG. 13B is a block diagram illustrating an example of a more detailed configuration of the electronic apparatus of FIG. 13A.

Referring to FIG. 13B, the object detection module 210, the object region detection module 220, the warping module 230, and the driving control module 250 are executed/controlled by the first processor 140-1, while the object identification module 240 may be executed by the second processor 140-2.

In an embodiment, as a result of the object identification module 240 may be executed by the first processor 140-1, the second processor 140-2 may perform the object identification under the control of the first processor 140-1, and therefore, the configuration of the electronic apparatus 100 is not limited to the configuration of FIG. 13B.

In addition, when the object detection module 210 uses at least one artificial intelligence model trained to detect the object based on the sensing data, the object detection module 210 may be operated by the second processor 140-2 or by the first and the second processors 140-1 and 140-2, unlike FIG. 13B.

Hereinafter, a control method of an electronic apparatus according to an embodiment will be described with reference to FIGS. 14, 15, 16, and 17.

Figure 14:
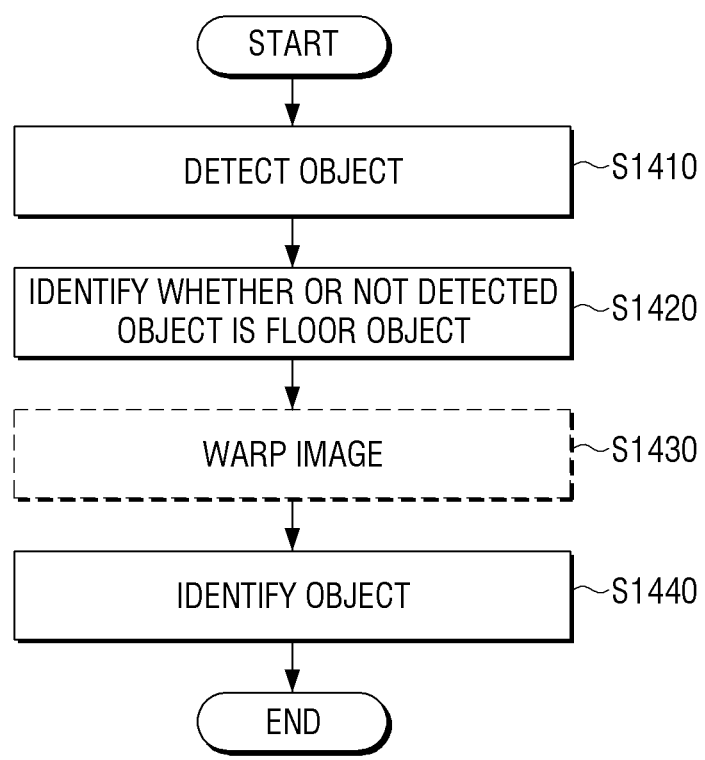
FIG. 14 is a flowchart illustrating a method of controlling an electronic apparatus according to an embodiment.

FIG. 14 is a flowchart illustrating a control method of an electronic apparatus including a memory storing an artificial intelligence model trained to identify an object according to an embodiment.

Referring to FIG. 14, in the control method of an electronic apparatus according to an embodiment, an object may be detected based on sensing data received from a sensor (S1410).

In addition, whether the detected object is a floor object may be identified (S1420). The floor object may be an object placed on a floor where the electronic apparatus is located and may refer to an object of which a height from the floor is less than a predetermined threshold value.

Specifically, the height of the object detected from the floor may be identified, and the detected object may be identified as the floor object when the identified height is less than a predetermined threshold value.

In addition, if the detected object is identified as the floor object, at least a portion of an image acquired through a camera may be warped (S1430). Specifically, an object region including the detected object in the image may be warped based on distance information of the object region.

By warping, positions of the pixels may be transformed using a position transform function such that distance information of a plurality of pixels in the object region corresponds to a reference distance. As a result, among a plurality of regions included in the object region, a region farther than the reference distance may be scaled up, and a region closer than the reference distance may be scaled down.

The distance information refers to a distance between a specific portion of an object represented by each of the plurality of pixels in the object region and the electronic apparatus or the camera.

Specifically, in the control method of an electronic apparatus according to an embodiment, distance information of each of a plurality of pixels constituting the object region may be acquired, and the positions of the plurality of pixels may be transformed based on the acquired distance information.

A reference pixel corresponding to the reference distance among the plurality of pixels included in the object region may be identified based on the acquired distance information, and a first pixel having a distance farther than the reference distance and a second pixel having a distance closer than the reference distance among the plurality of pixels may be identified.

In addition, a position of the first pixel may be transformed such that a distance between the first pixel and the reference pixel is increased, and a position of the second pixel may be transformed such that a distance between the second pixel and the reference pixel is decreased.

In this case, the position of the first pixel may be transformed such that the degree of an increase in an interval between the reference pixel and the first pixel after transformation increases as the difference between the reference distance and the distance of the first pixel increases. In addition, the position of the second pixel may be transformed such that the degree of a decrease in an interval between the reference pixel and the second pixel after transformation increases as a difference between the reference distance and the distance of the second pixel increases.

A distance of a region in which a focus of the camera is positioned in the acquired image may be set as the reference distance. Alternatively, the reference distance may be set within a distance range in which the artificial intelligence model may identify the object.

Alternatively, at least one pixel corresponding to the closest distance among the plurality of pixels in the object region may be identified as the reference pixel. That is, the distance of the corresponding pixel may be set as the reference distance.

Here, a first region may be scaled up such that the degree to which the first region is enlarged increases as a difference between a distance of the first region and the reference distance increases, and a second region may be scaled down such that the degree to which the second region is reduced increases as a difference between a distance of the second region and the reference distance increases.

If the detected object is identified as not the floor object, the warping in S1430 may not be performed.

In addition, in the control method of an electronic apparatus according to an embodiment, the detected object may be identified by inputting the object region into the artificial intelligence model (S1440). Specifically, if the detected object is identified as the floor object, the object region warped according to S1430 is input to the artificial intelligence model, and if the detected object is identified as not the floor object, an object region that has not undergone S1430 may be input to the artificial intelligence mode.

In the control method of an electronic apparatus according to an embodiment, the warped object region may be input into the artificial intelligence model to acquire information on the object included in the warped object region and a reliability value of the information on the object.

In an embodiment, if the acquired reliability value is less than a threshold value, the detected object may be identified by inputting the object region including the detected object of the image into the artificial intelligence model. That is, the object may be identified by inputting an unwarped object region into the artificial intelligence model.

Figure 15:
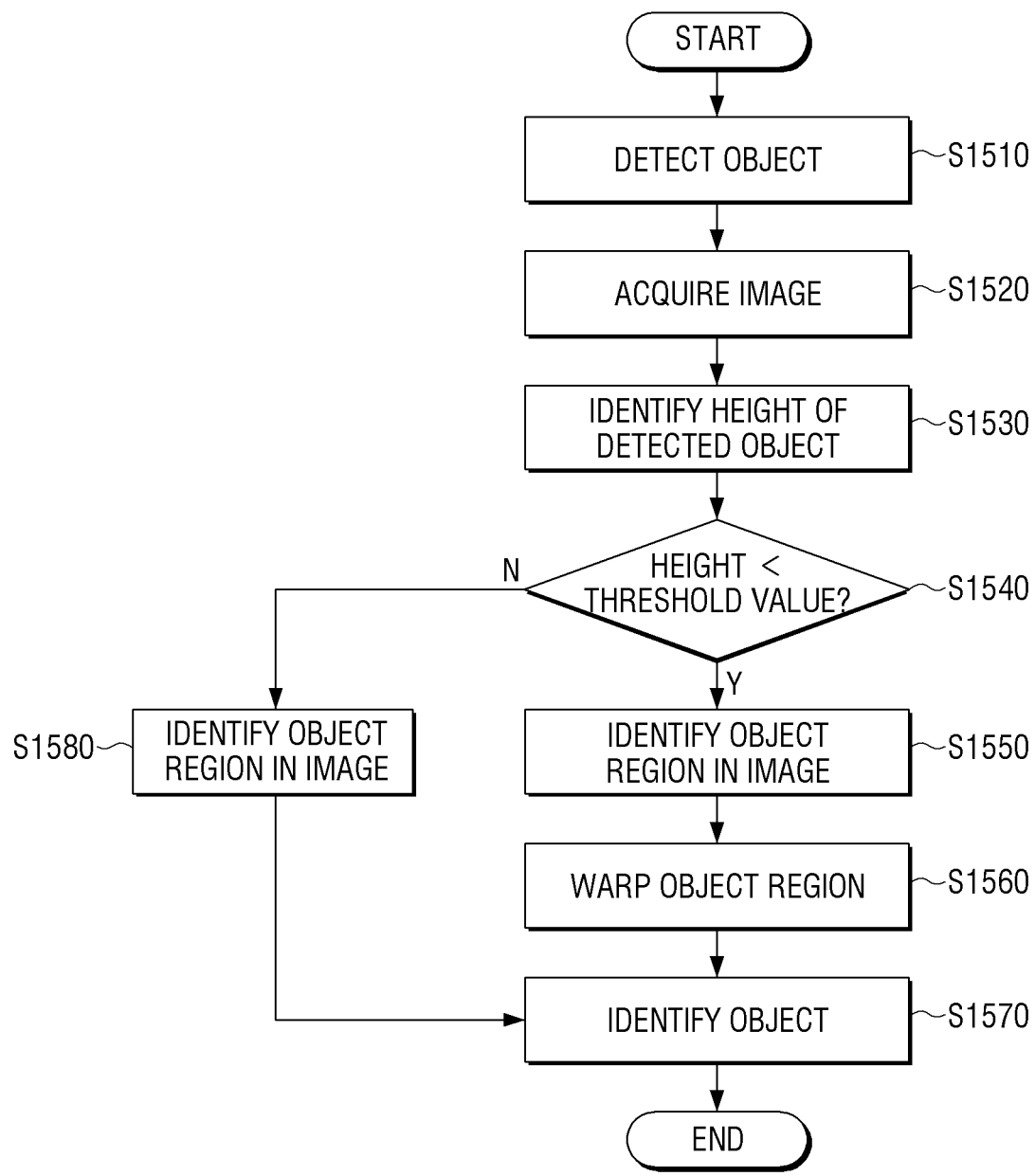
FIG. 15 is a flowchart illustrating an example of warping an object region and identifying an object according to whether a floor object is detected, in a method of controlling an electronic apparatus according to an embodiment.

FIG. 15 is an algorithm illustrating an example of warping an object region and identifying an object according to whether the floor object is detected in the control method according to an embodiment.

Referring to FIG. 15, in the control method of an electronic apparatus according to an embodiment, an object may be detected based on sensing data (S1510). In addition, if the object is detected, an image acquired by capturing a direction in which the detected object is located may be acquired (S1520).

In the control method of an electronic apparatus according to an embodiment, a height of the object detected based on the sensing data may be identified (S1530). If the identified height is less than a threshold value ('Y' in S1540), the corresponding object may be identified as the floor object.

In addition, an object region including the object of the previously acquired image may be identified (S1550), and the identified object region may be warped according to distance information (S1560).

In addition, the object may be identified by inputting the warped object region into the artificial intelligence model (S1570).

On the other hand, if the identified height is the threshold value or more ('N' in S1540), the corresponding object may be identified as not the floor object. In this case, the object region may be identified in the image (S1580), and the object may be identified by inputting the identified object region into the artificial intelligence model (S1570). In this case, preprocessing required before inputting the object region into the artificial intelligence model, such as scaling the entire size of the object region, may be performed, but the identifying the object region in S1560 and the warping of the object region according to the distance information in S1560 may be skipped.

The memory may further store a separate artificial intelligence model trained to identify the floor object based on a plurality of images including the floor object. In this case, in the control method of an electronic apparatus according to an embodiment, if the detected object is identified as the floor object, the detected object may be identified by inputting the object region including the detected object of the image into the separate artificial intelligence model described above.

Figure 16:
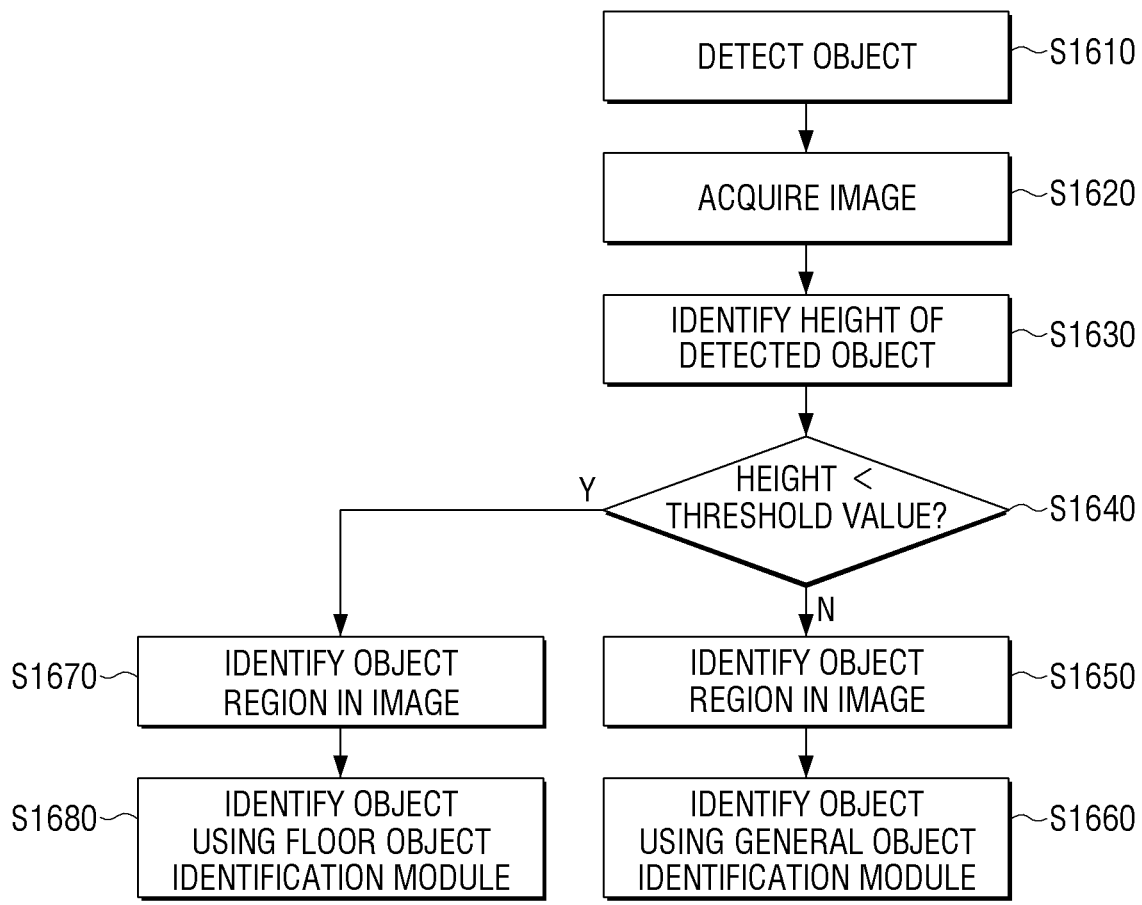
FIG. 16 is a flowchart illustrating an example of using an artificial intelligence model according to whether a floor object is detected, in a method of controlling an electronic apparatus according to an embodiment.

FIG. 16 is an algorithm illustrating an example of using an artificial intelligence model according to whether the floor object is detected in the control method according to an embodiment.

Referring to FIG. 16, in the control method of an electronic apparatus according to an embodiment, an object may be detected based on sensing data (S1610). In addition, if the object is detected, an image for the detected object may be acquired (S1620).

In the control method of an electronic apparatus according to an embodiment, a height of the object detected based on the sensing data may be identified (S1630). If the identified height is identified as a threshold value or more (N in S1640), an object region in the image may be identified (S1650), and the object may be identified using the identified object region and a general object identification module (S1660). The general object identification module may input the object region into an artificial intelligence model trained to identify an object other than the floor object.

On the other hand, if the identified height is less than the threshold value (Yin S1640), the object region may be identified (S1670), and the object may be identified using the identified object region and a floor object identification module (S1680). The floor object identification module may input the object region into an artificial intelligence model trained to identify the floor object.

In this case, the artificial intelligence model trained to identify the floor object may be classified into a plurality of artificial intelligence models. The plurality of artificial intelligence models may be artificial intelligence models trained based on images of the floor object captured at different distances.

In the control method of an electronic apparatus according to an embodiment, the object region may be input to an artificial intelligence model trained based on an image corresponding to distance information of the object region, among the plurality of artificial intelligence models.

In a case in which the electronic apparatus includes a driver, in the control method of an electronic apparatus according to an embodiment, driving of the electronic apparatus may be controlled according to whether the detected object is the floor object and an object identification result.

Figure 17:
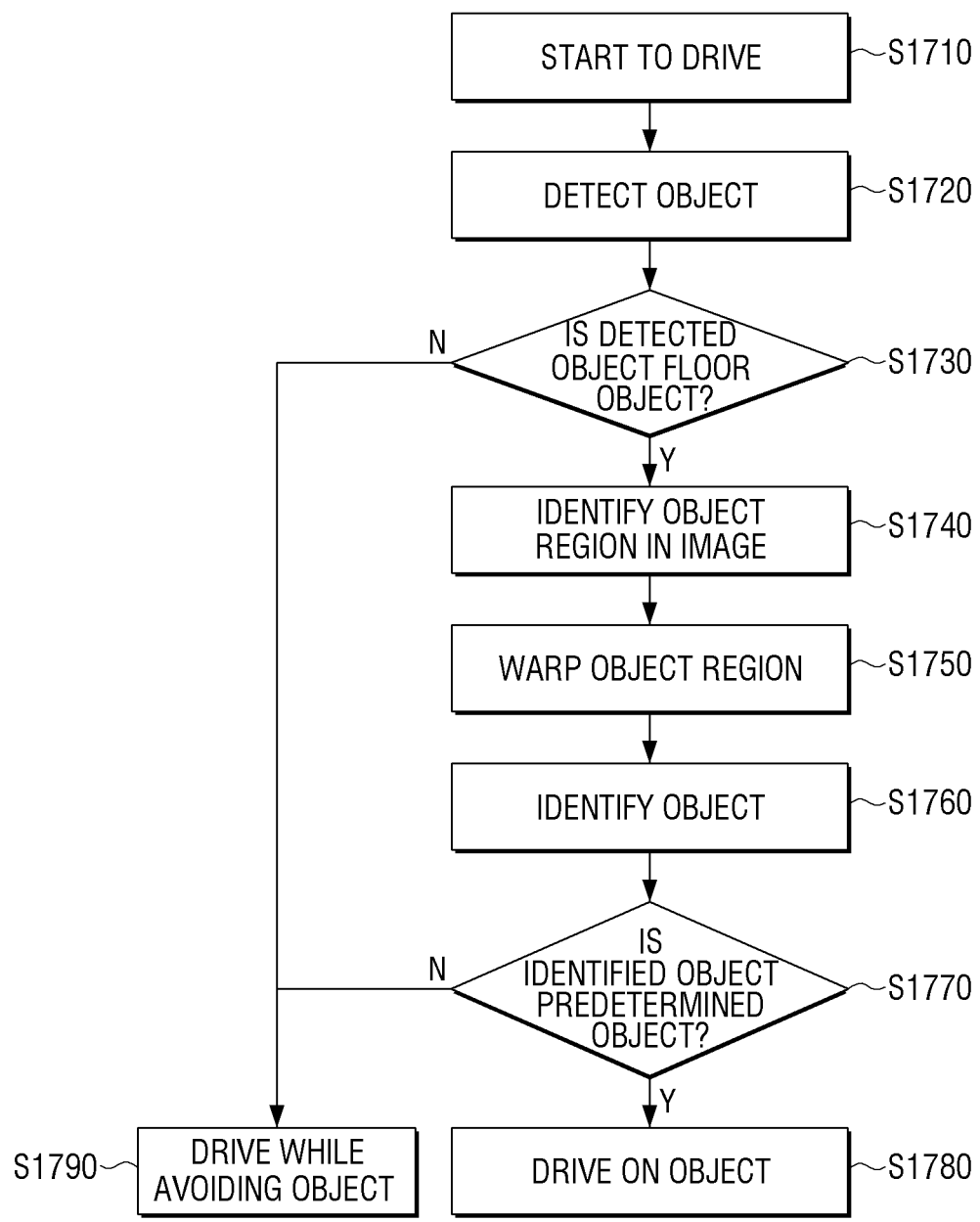
FIG. 17 is a flowchart illustrating an example of a method of controlling an electronic apparatus based on whether a floor object is detected and an object identification result, according to an embodiment.

FIG. 17 is a flowchart illustrating an example of reflecting whether the floor object is detected and an object identification result to driving in the control method according to an embodiment.

Referring to FIG. 17, in the control method of an electronic apparatus according to an embodiment, the electronic apparatus may be controlled to start driving (S1710). In addition, objects around the electronic apparatus may be detected using sensing data received through a sensor while driving (S1720). Specifically, various obstacles located in a driving direction of the electronic apparatus may be detected.

If the object is detected, whether the detected object is a floor object may be identified (S1730). Specifically, it may be determined whether the detected object is the floor object according to whether a height of the detected object is less than a threshold value.

In addition, if the detected object is determined as the floor object (Yin S1730), an object region including the object of the image acquired through the camera may be identified (S1740), and the identified object region may be warped according to distance information (S1750).

In addition, the object may be identified through the warped object region (S1760).

If the identified object is a predetermined object such as a carpet or a threshold (Y in S1770), the electronic apparatus may be controlled to drive on the corresponding object or drive to climb over the corresponding object (S1780). On the other hand, if the identified object is not the predetermined object (N in S1770), the electronic apparatus may be controlled to drive while avoiding the corresponding object (S1790).

If the detected object is identified as not the floor object (N in S1730), the electronic apparatus may be controlled to drive while avoiding the detected object (S1790).

The control method described with reference to FIGS. 14 to 17 may be implemented through the electronic apparatus 100 illustrated and described with reference to FIGS. 2A, 7A, 9A, 12, and 13A.

Alternatively, the control method described with reference to FIGS. 14 to 17 may also be implemented through a system including the electronic apparatus 100 and one or more external devices.

As such, the electronic apparatus and the control method thereof according to an embodiment have an effect that objects around the electronic apparatus may be accurately recognized regardless of the height of the objects and an angle of the camera provided in the electronic apparatus.

In particular, the electronic apparatus according to an embodiment has advantages that even a flat object captured through the camera of a low position may be recognized with high accuracy.

The embodiments described above may be implemented in a recording medium readable by a computer or similar device using software, hardware, and/or a combination thereof.

According to hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, the embodiments described in the specification may be implemented by the processor itself. According to software implementation, the embodiments such as procedures and functions described in the disclosure may be implemented as separate software modules. Each of the software modules described above may perform one or more functions and operations described in the specification.

Computer instructions for performing processing operations of the electronic apparatus 100 according to the various embodiments described above may be stored in a non-transitory computer-readable medium. The computer instructions stored in the non-transitory computer-readable medium allow a specific device to perform the processing operations of the electronic apparatus 100 according to the various embodiments described above when being executed by a processor of the specific device.

The non-transitory computer-readable medium refers to a medium that stores data semi-permanently and is read by a device, not a medium storing data for a short time such as a register, a cache, a memory, and the like. An example of the non-transitory computer-readable medium may include a compact disk (CD), a digital versatile disk (DVD), a hard disk, a Blu-ray disk, a universal serial bus (USB), a memory card, a read only memory (ROM), or the like.

Although a few embodiments have been shown and described, it would be appreciated by those skilled in the art that changes may be made in embodiments without departing from the principles and spirit of the disclosure, the scope of which is defined in the claims and their equivalents.

What is claimed is:
1. An electronic apparatus, comprising:
a sensor;
a camera;
a memory; and
a processor configured to be connected to the sensor, the camera, and the memory,
wherein the memory includes an artificial intelligence model trained to identify at least one object,
wherein the processor is further configured to:
detect an object based on sensing data received from the sensor;

based on the detected object being identified as having a height less than a predetermined threshold value, warp an object region, including the detected object, in an image acquired through the camera based on distance information of the object region; and identify the detected object by inputting the warped object region into the artificial intelligence model, and wherein in warping of the object region, the processor is further configured to acquire a plurality of pieces of distance information of a plurality of pixels constituting the object region, respectively, and transform positions of the plurality of pixels with a varying degree based on the acquired plurality of pieces of distance information, respectively.

2. The electronic apparatus as claimed in claim 1, wherein further based on a determination that the detected object being positioned on a plane on which the electronic apparatus is located, the processor is further configured to warp the object region is performed, and wherein the height of the detected object is identified from the plane on which the electronic apparatus is located.

3. The electronic apparatus as claimed in claim 2, wherein the predetermined threshold value is predetermined based on a maximum height crossable or climbable by the electronic apparatus when the electronic apparatus is driven to move.

4. The electronic apparatus as claimed in claim 1, wherein in transforming the positions of the plurality of pixels, the processor is further configured to:

identify, among the plurality of pixels, a reference pixel corresponding to a reference distance, based on the acquired distance information;

transform a position of a first pixel, of which a distance is greater than the reference distance, such that an interval between the first pixel and the reference pixel increases; and transform a position of a second pixel, of which a distance is less than the reference distance, such that an interval between the second pixel and the reference pixel decreases.

5. The electronic apparatus as claimed in claim 4, wherein in transforming the positions of the plurality of pixels, the processor is further configured to:

transform the position of the first pixel such that a degree of an increase in the interval between the first pixel and the reference pixel becomes greater as a difference between the reference distance and the distance of the first pixel increases, and transform the position of the second pixel such that a degree of a decrease in the interval between the second pixel and the reference pixel becomes greater as a difference between the reference distance and the distance of the second pixel increases.

6. The electronic apparatus as claimed in claim 4, wherein in the transforming the positions of the plurality of pixels, the processor is further configured to identify, as the reference pixel, at least one pixel corresponding to a closest distance among the plurality of pixels.

7. The electronic apparatus as claimed in claim 4, wherein the processor is further configured to set, as the reference distance, a distance of a region in which a focus of the camera is positioned in the acquired image.

8. The electronic apparatus as claimed in claim 4, wherein the reference distance is predetermined within a distance range in which the artificial intelligence model identifies the object.

9. The electronic apparatus as claimed in claim 1, wherein the processor is further configured to:

acquire information on the object included in the warped object region and a reliability value of the information on the object, by inputting the warped object region into the artificial intelligence model, and based on the acquired reliability value being less than a threshold value, identify the detected object by inputting the object region that is not warped into the artificial intelligence model.

10. The electronic apparatus as claimed in claim 1, wherein the processor is further configured to, based on a determination that the detected object has a height equal to or greater than the predetermined threshold value, identify the detected object by inputting the object region, that is not warped, into the artificial intelligence model.

11. The electronic apparatus as claimed in claim 1, wherein the processor is further configured to identify, among the plurality of pixels constituting the object region, a reference pixel corresponding to a reference distance from the camera, and wherein a piece of distance information of each pixel of the plurality of pixels includes information of a distance between each pixel of the plurality of pixels and the reference pixel.

12. An electronic apparatus comprising:

a sensor;

a camera;

a memory; and a processor configured to be connected to the sensor, the camera, and the memory, wherein the memory includes a plurality of artificial intelligence models trained to identify at least one object, wherein the plurality of artificial intelligence models are trained based on images of the at least one object captured at different distances, wherein the processor is further configured to:

detect an object based on sensing data received from the sensor;

based on the detected object being identified as having a height less than a predetermined threshold value, warp an object region, including the detected object, in an image acquired through the camera based on distance information of the object region;

identify, among the plurality of artificial intelligence models, an artificial model that is trained based on an image corresponding to the distance information of the object region; and identify the detected object by inputting the warped object region into the identified artificial intelligence model, and wherein in warping of the object region, the processor is further configured to acquire a plurality of pieces of distance information of a plurality of pixels constituting the object region, respectively, and transform positions of the plurality of pixels with a varying degree based on the acquired plurality of pieces of distance information, respectively.

13. A method of controlling an electronic apparatus, the electronic apparatus including a memory in which an artificial intelligence model trained to identify an object is stored, the method comprising:

detecting an object based on sensing data received from a sensor;

identifying whether the detected object is crossable or climbable by the electronic apparatus when the electronic apparatus is driven to move;

based on the detected object being identified as being crossable or climbable by the electronic apparatus, warping an object region, including the detected object, in an image acquired through a camera based on distance information of the object region; and identifying the detected object by inputting the warped object region into the artificial intelligence model, wherein the warping comprises acquiring a plurality of pieces of distance information of a plurality of pixels constituting the object region, respectively, and transforming positions of the plurality of pixels with a varying degree based on the acquired plurality of pieces of distance information, respectively.

14. The method as claimed in claim 13, wherein the warping the object region is performed further based on a determination that the detected object being positioned on a plane on which, and wherein the detected object is identified as being crossable or climbable based on a height of the detected object from the plane on which the electronic apparatus is located.

15. The method as claimed in claim 13, wherein the warping comprises:

identifying, among the plurality of pixels, a reference pixel corresponding to a reference distance, based on the acquired distance information;

transforming a position of a first pixel, of which a distance is greater than the reference distance, such that an interval between the first pixel and the reference pixel increases; and transforming a position of a second pixel, of which a distance is less than the reference distance, such that an interval between the second pixel and the reference pixel decreases.

16. The method as claimed in claim 15, wherein the transforming the position of the first pixel comprises transforming the position of the first pixel such that a degree of an increase in the interval between the first pixel and the reference pixel becomes greater as a difference between the reference distance and a distance of the first pixel increases, and wherein the transforming the position of the second pixel comprises transforming the position of the second pixel such that a degree of a decrease in the interval between the second pixel and the reference pixel becomes greater as a difference between the reference distance and a distance of the second pixel increases.

17. The method as claimed in claim 15, wherein in the warping, at least one pixel corresponding to a closest distance among the plurality of pixels is identified as the reference pixel.

18. The method as claimed in claim 13, wherein the identifying of the object comprises:

acquiring information on the object included in the warped object region and a reliability value of the information on the object, by inputting the warped object region into the artificial intelligence model, and based on the acquired reliability value being less than a threshold value, identifying the detected object by inputting the object region that is not warped into the artificial intelligence model.

19. The method as claimed in claim 13, further comprising identifying the detected object by inputting the object region, that is not warped, into the artificial intelligence model, based on the detected object being identified as not being crossable or climbable by the electronic apparatus.

* * * * *